United States Patent
Aswathanarayana et al.

(10) Patent No.: US 9,116,737 B2
(45) Date of Patent: Aug. 25, 2015

(54) CONVERSION OF VIRTUAL DISK SNAPSHOTS BETWEEN REDO AND COPY-ON-WRITE TECHNOLOGIES

(71) Applicant: VMware, Inc., Palo Alto, CA (US)

(72) Inventors: Tejasvi Aswathanarayana, Malden, MA (US); Komal Desai, Fremont, CA (US); Patrick William Penzias Dirks, Palo Alto, CA (US); Sujay Godbole, Roxbury, MA (US); Jesse Pool, Mountain View, CA (US); Ilia Sokolinski, Brighton, MA (US); Derek Uluski, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 13/874,298

(22) Filed: Apr. 30, 2013

(65) Prior Publication Data
US 2014/0325170 A1    Oct. 30, 2014

(51) Int. Cl.
G06F 13/00    (2006.01)
G06F 9/455    (2006.01)
G06F 11/14    (2006.01)
G06F 11/20    (2006.01)

(52) U.S. Cl.
CPC .......... G06F 9/45558 (2013.01); G06F 11/14 (2013.01); G06F 11/1471 (2013.01); G06F 11/20 (2013.01)

(58) Field of Classification Search
None
See application file for complete search history.

(56) References Cited

U.S. PATENT DOCUMENTS 6,795,966 B1 * 9/2004 Lim et al. .......................... 718/1
7,529,897 B1 * 5/2009 Waldspurger et al. ........ 711/162
8,117,168 B1 * 2/2012 Stringham ..................... 707/646
8,151,263 B1 * 4/2012 Venkitachalam et al. ........ 718/1
2007/0033356 A1 * 2/2007 Erlikhman ..................... 711/162
2008/0244028 A1 * 10/2008 Le et al. ......................... 709/208
2009/0249119 A1 * 10/2009 Sethumadhavan et al. ..... 714/15
2009/0288084 A1 * 11/2009 Astete et al. ...................... 718/1
2010/0070725 A1 * 3/2010 Prahlad et al. ................ 711/162
2010/0107158 A1 * 4/2010 Chen et al. ......................... 718/1
2010/0299368 A1 * 11/2010 Hutchins et al. .............. 707/803
2011/0113206 A1 * 5/2011 Heim ............................ 711/162
2011/0191555 A1 * 8/2011 Narayanan .................... 711/162
2013/0054888 A1 * 2/2013 Bhat et al. ..................... 711/114
2013/0333042 A1 * 12/2013 Saika ............................... 726/24
2013/0339643 A1 * 12/2013 Tekade et al. ................. 711/162
2014/0095823 A1 * 4/2014 Shaikh et al. ................. 711/165
2014/0149983 A1 * 5/2014 Bonilla et al. ..................... 718/1
2014/0189429 A1 * 7/2014 Gill et al. ......................... 714/19

* cited by examiner

*Primary Examiner* — Aimee Li
*Assistant Examiner* — Dustin Bone

(57) ABSTRACT

A framework for converting between copy-on-write (COW) and redo-based technologies is disclosed. To take a virtual disk snapshot, disk descriptor files, which include metadata information about data stored in virtual volumes (vvols), are "swizzled" such that the descriptor file for a latest redo log, to which IOs are currently performed, points to the base vvol of a COW-based vvol hierarchy. A disk descriptor file previously associated with the base vvol may also be updated to point to the vvol newly created by the snapshot operation. To revert to an earlier disk state, a snapshot may be taken before copying contents of a snapshot vvol of the COW-based vvol hierarchy to a base vvol of the hierarchy, thereby ensuring that the reversion can be rolled back if it is unsuccessful. Reference counting is performed to ensure that vvols in the vvol hierarchy are not orphaned in delete and revert use cases. Differences between vvols in the COW-based vvol hierarchy are used to clone the hierarchy and to migrate the hierarchy to a redo-based disk hierarchy.

18 Claims, 22 Drawing Sheets

CONVERSION OF VIRTUAL DISK SNAPSHOTS BETWEEN REDO AND COPY-ON-WRITE TECHNOLOGIES

BACKGROUND

As computer systems scale to enterprise levels, particularly in the context of supporting large-scale data centers, the underlying data storage systems frequently employ a storage area network (SAN) or network attached storage (NAS). As is conventionally well appreciated, SAN or NAS provides a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

SCSI and other block protocol-based storage devices, such as a storage system 30 shown in FIG. 1A, utilize a storage system manager 31, which represents one or more programmed storage processors, to aggregate the storage units or drives in the storage device and present them as one or more LUNs (Logical Unit Numbers) 34 each with a uniquely identifiable number. LUNs 34 are accessed by one or more computer systems 10 through a physical host bus adapter (HBA) 11 over a network 20 (e.g., Fibre Channel, etc.). Within computer system 10 and above HBA 11, storage access abstractions are characteristically implemented through a series of software layers, beginning with a low-level device driver layer 12 and ending in an operating system specific file system layers 15. Device driver layer 12, which enables basic access to LUNs 34, is typically specific to the communication protocol used by the storage system (e.g., SCSI, etc.). A data access layer 13 may be implemented above device driver layer 12 to support multipath consolidation of LUNs 34 visible through HBA 11 and other data access control and management functions. A logical volume manager 14, typically implemented between data access layer 13 and conventional operating system file system layers 15, supports volume-oriented virtualization and management of LUNs 34 that are accessible through HBA 11. Multiple LUNs 34 can be gathered and managed together as a volume under the control of logical volume manager 14 for presentation to and use by file system layers 15 as a logical device.

FIG. 1B is a block diagram of a conventional NAS or file-level based storage system 40 that is connected to one or more computer systems 10 via network interface cards (NIC) 11' over a network 21 (e.g., Ethernet). Storage system 40 includes a storage system manager 41, which represents one or more programmed storage processors. Storage system manager 41 implements a file system 45 on top of physical, typically disk drive-based storage units, referred to in FIG. 1B as spindles 42, that reside in storage system 40. From a logical perspective, each of these spindles can be thought of as a sequential array of fixed sized extents 43. File system 45 abstracts away complexities of targeting read and write operations to addresses of the actual spindles and extents of the disk drives by exposing to connected computer systems, such as computer systems 10, a namespace comprising directories and files that may be organized into file system level volumes 44 (hereinafter referred to as "FS volumes") that are accessed through their respective mount points.

It has been recognized that the storage systems described above are not sufficiently scalable to meet the particular needs of virtualized computer systems. For example, a cluster of server machines may service as many as 10,000 virtual machines (VMs), each VM using a multiple number of "virtual disks" and a multiple number of "snapshots," each of which may be stored, for example, as a file on a particular LUN or FS volume. Even at a scaled down estimation of 2 virtual disks and 2 snapshots per VM, this amounts to 60,000 distinct disks for the storage system to support if VMs were directly connected to physical disks (i.e., 1 virtual disk or snapshot per physical disk). In addition, storage device and topology management at this scale are known to be difficult. As a result, the concept of datastores in which VMs are multiplexed onto a smaller set of physical storage entities (e.g., LUN-based VMFS clustered file systems or FS volumes), such as described in U.S. Pat. No. 7,849,098, entitled "Providing Multiple Concurrent Access to a File System," incorporated by reference herein, was developed.

In conventional storage systems employing LUNs or FS volumes, workloads from multiple VMs are typically serviced by a single LUN or a single FS volume. As a result, resource demands from one VM workload will affect the service levels provided to another VM workload on the same LUN or FS volume. Efficiency measures for storage such as latency and input/output operations per second, or IOPS, thus vary depending on the number of workloads in a given LUN or FS volume and cannot be guaranteed. Consequently, storage policies for storage systems employing LUNs or FS volumes cannot be executed on a per-VM basis and service level agreement (SLA) guarantees cannot be given on a per-VM basis. In addition, data services provided by storage system vendors, such as snapshot, replication, encryption, and deduplication, are provided at a granularity of the LUNs or FS volumes, not at the granularity of a VM's virtual disk. As a result, snapshots can be created for the entire LUN or the entire FS volume using the data services provided by storage system vendors, but a snapshot for a single virtual disk of a VM cannot be created separately from the LUN or the file system in which the virtual disk is stored.

An object-based storage system disclosed in U.S. patent application Ser. No. 13/219,358, filed Aug. 26, 2011, incorporated by reference herein, provides a solution by exporting logical storage volumes that are provisioned as storage objects, referred to herein as "virtual volumes." These storage objects are accessed on demand by connected computer systems using standard protocols, such as SCSI and NFS, through logical endpoints for the protocol traffic that are configured in the storage system. Logical storage volumes are created from one or more logical storage containers having an address space that maps to storage locations of the physical data storage units. The reliance on logical storage containers provide users of the object-based storage system with flexibility in designing their storage solutions, because a single logical storage container may span more than one physical storage system and logical storage containers of different customers can be provisioned from the same physical storage system with appropriate security settings. In addition, storage operations such as snapshots, cloning, etc. of the virtual disks may be offloaded to the storage system using the logical storage volumes.

Storage systems typically employ a copy-on-write (COW) approach to take disk snapshots. Under such an approach, IOs are performed to a base disk, while snapshots are maintained as mainly read-only point-in-time copies of the disk to which contents of base disk may be copied on writes to preserve the state of the disk at the previous times. In contrast, the connected computer system may employ redo-based disk snapshotting. When a redo-based snapshot is taken, a redo log is created that points to an immediately prior redo log, which itself points to another redo log, and so on, until a base disk is reached. The chain of redo logs tracks differences between the base disk state and later disk states. As COW- and redo-based approaches are semantic opposites, redo-based snapshots are typically not supported by COW-based storage systems, i.e., redo-based snapshots cannot be readily offloaded to such systems. Further, the storage pools for snapshots in the COW-based storage system may be optimized for read-only snapshots and therefore not optimal for writable redo logs.

SUMMARY

One or more embodiments disclosed herein provide techniques for taking a snapshot of a virtual disk. The techniques include issuing a command to a storage system to take a first COW snapshot of the virtual disk. After taking the first COW snapshot, the virtual disk comprises a logical storage volume hierarchy including at least a base logical storage volume and a snapshot logical storage volume. The techniques further include changing a first disk descriptor file associated with the snapshot logical storage volume and a second disk descriptor file associated with the base logical storage volume to be associated instead with the base logical storage volume and the snapshot logical storage volume, respectively.

Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein provide a framework for converting between copy-on-write (COW) and redo-based technologies. To take a virtual disk snapshot, disk descriptor files, which include metadata information about data stored in virtual volumes (vvols), are "swizzled" such that the descriptor file for a latest redo log, to which IOs are currently performed, points to the base vvol of a COW-based vvol hierarchy. This may be accomplished, e.g., by updating a metadata "vvol ID" value to specify the base vvol. A disk descriptor file previously associated with the base vvol may also be updated to point to the vvol newly created by the snapshot operation. As a result, IOs to the latest redo log in the redo-based computer system are converted to IOs to the base vvol of the COW-based hierarchy. In one embodiment in which a virtual machine (VM) is associated with the virtual disk and is stunned during snapshotting, the snapshot operation may be split into two phases: an asynchronous preparation phase in which the storage system creates a COW snapshot vvol and continues to allow IOs to the current running point, and a synchronous snapshot phase in which the VM is stunned while the COW vvol hierarchy is associated with appropriate disk descriptor files via the swizzling operation described above. Doing so reduces the time needed for a snapshot, which may be required to be short to avoid guest IOs failing as a result of stunning the VM for too long.

To revert to an earlier disk state, a snapshot may be taken before copying contents of a snapshot vvol of the COW-based vvol hierarchy to a base vvol of the hierarchy. Doing so ensures that the reversion can be rolled back if it is unsuccessful. For example, in trying to revert a VM associated with two virtual disks to an earlier state, the reversion of one of those disks may fail, leaving the VM in an inconsistent state. In such a case, the revert operation may be rolled back using the snapshot taken beforehand, thereby returning the virtual machine to a consistent state.

Reference counting is performed to ensure that vvols in the vvol hierarchy are not orphaned in delete and revert use cases. In such cases, the disk descriptor file associated with a base vvol may be deleted, but the base vvol object itself not deleted, if any snapshot vvols depend on that base vvol. As a result, the snapshot vvols do not become orphaned. A reference count is maintained so that the base vvol is deleted if no snapshot vvols point to it any longer.

Differences between vvols in the COW-based vvol hierarchy are used to clone the hierarchy and to migrate the hierarchy to a redo-based disk hierarchy, and vice versa. The migration may try to recreate the logical hierarchy of the COW-based vvol hierarchy on a piecewise basis. In one embodiment, two vvols may be compared based on COW information stored for a vvol hierarchy to determine differences between the vvols. Alternatively, the actual data of the two vvols may be compared.

Figure 1A:
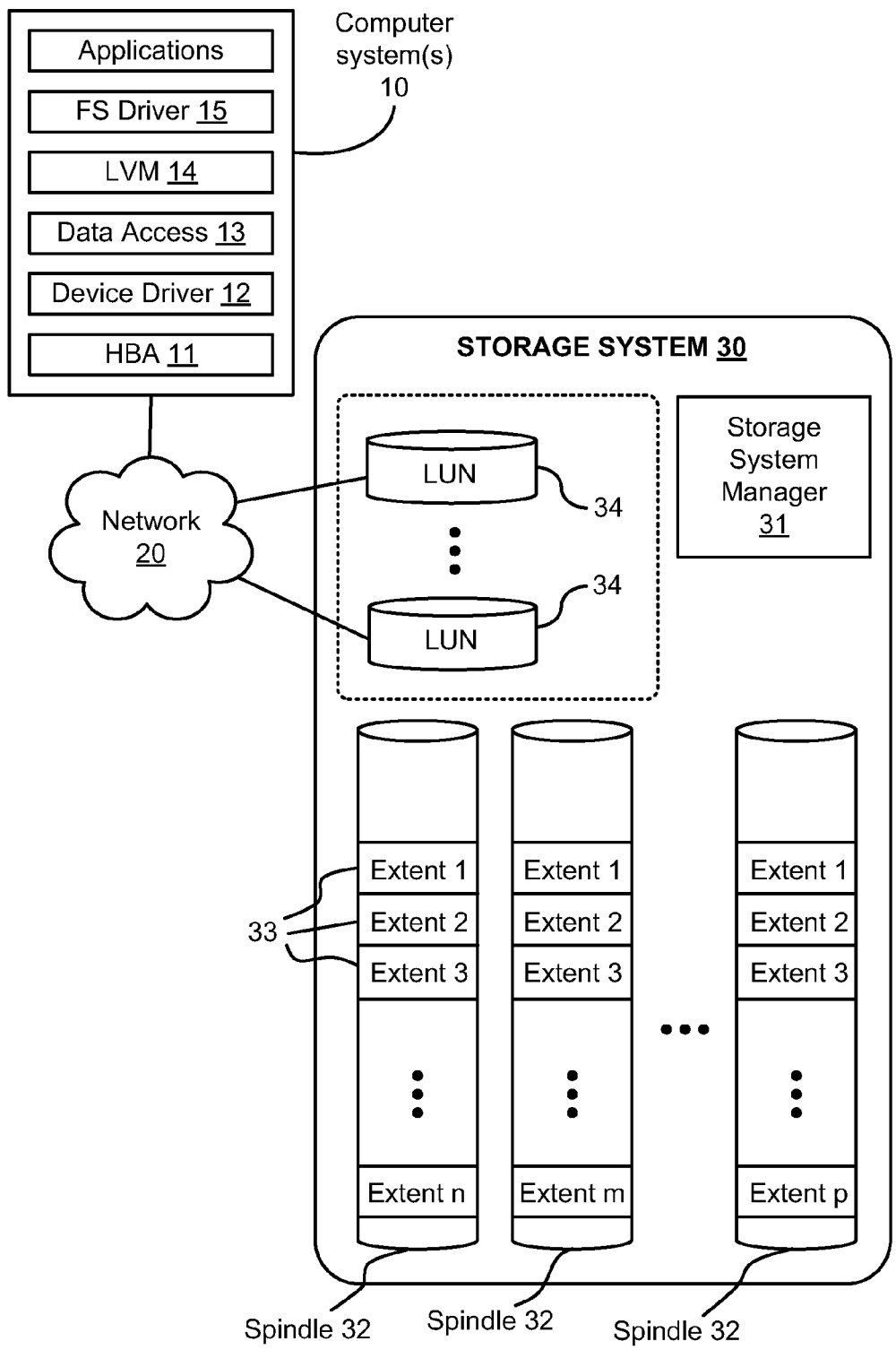
FIG. 1A illustrates a conventional block protocol-based storage device that is connected to one or more computer systems over a network.
Figure 1B:
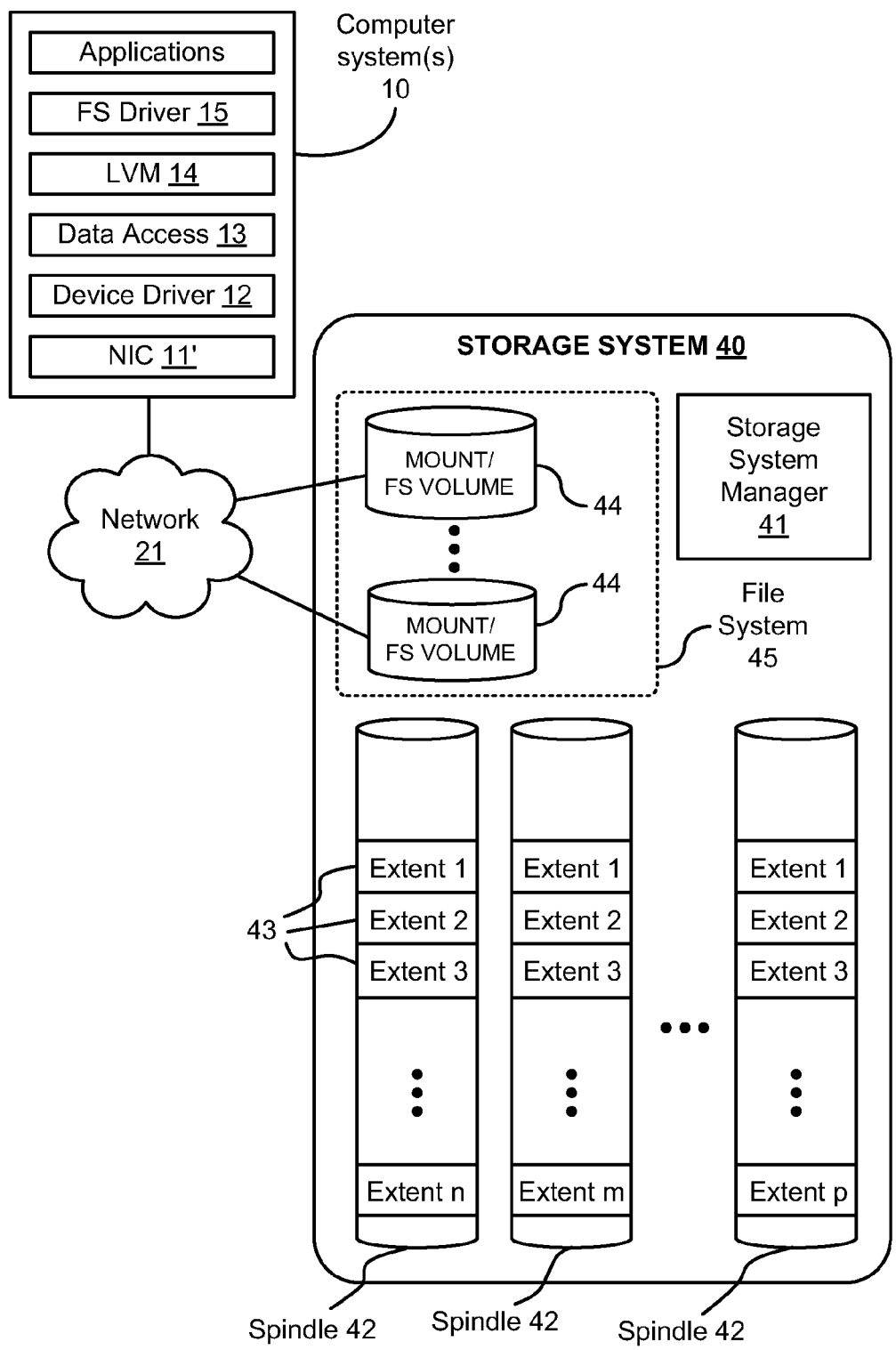
FIG. 1B illustrates a conventional NAS device that is connected to one or more computer systems over a network.
Figure 2A:
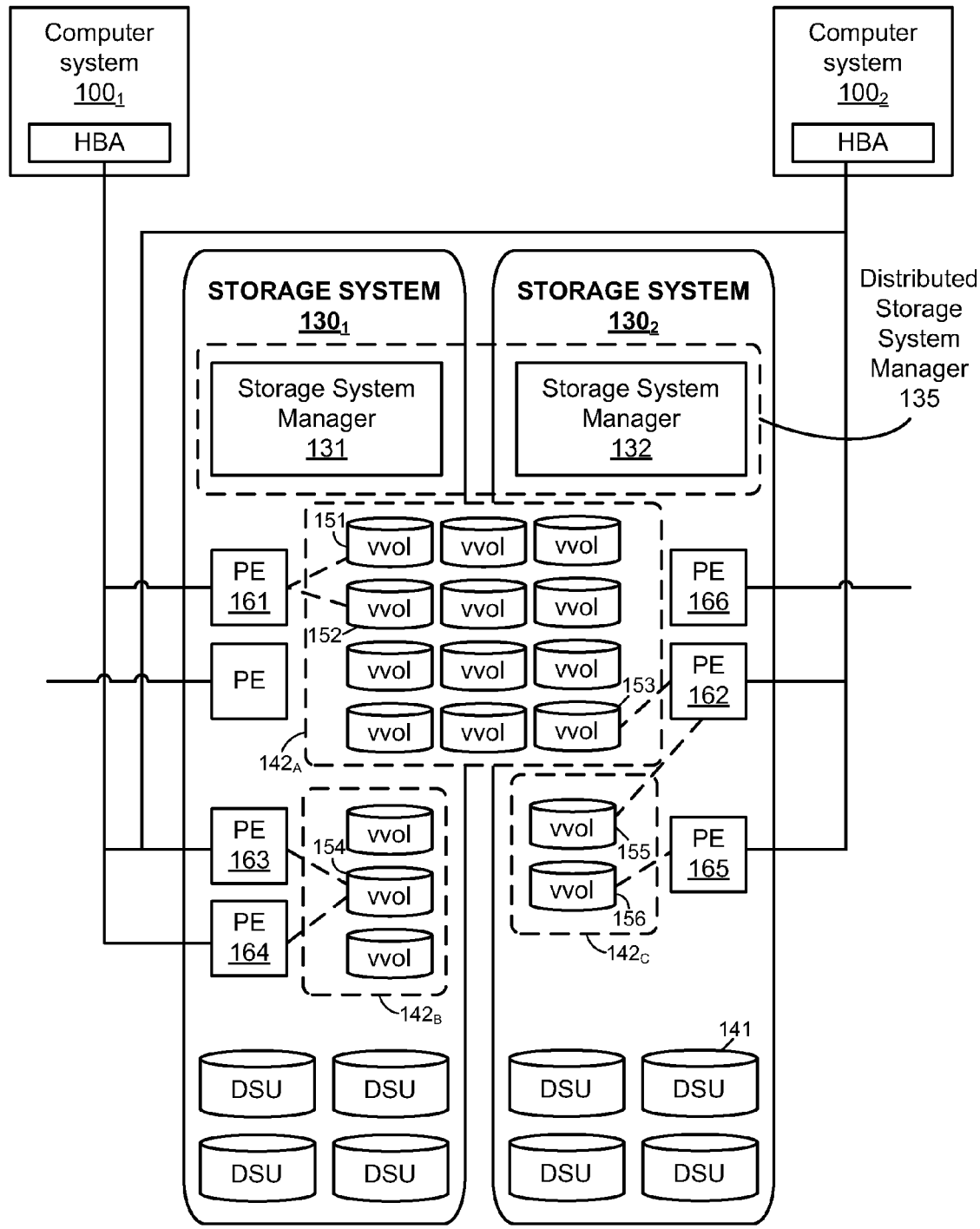
FIG. 2A illustrates a block protocol-based storage system cluster that implements virtual volumes.
Figure 2B:
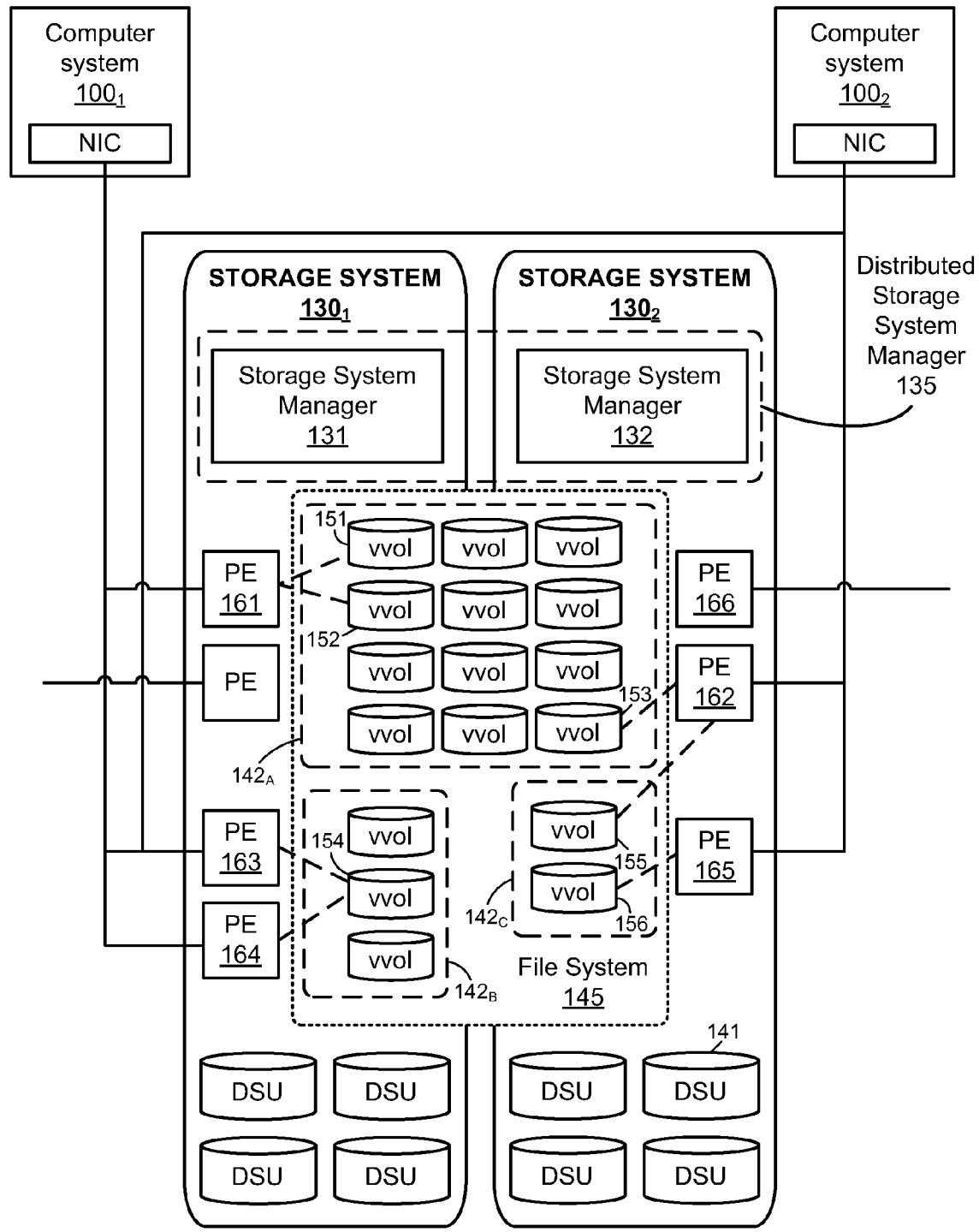
FIG. 2B illustrates a NAS based storage system cluster that implements virtual volumes.
Figure 6:
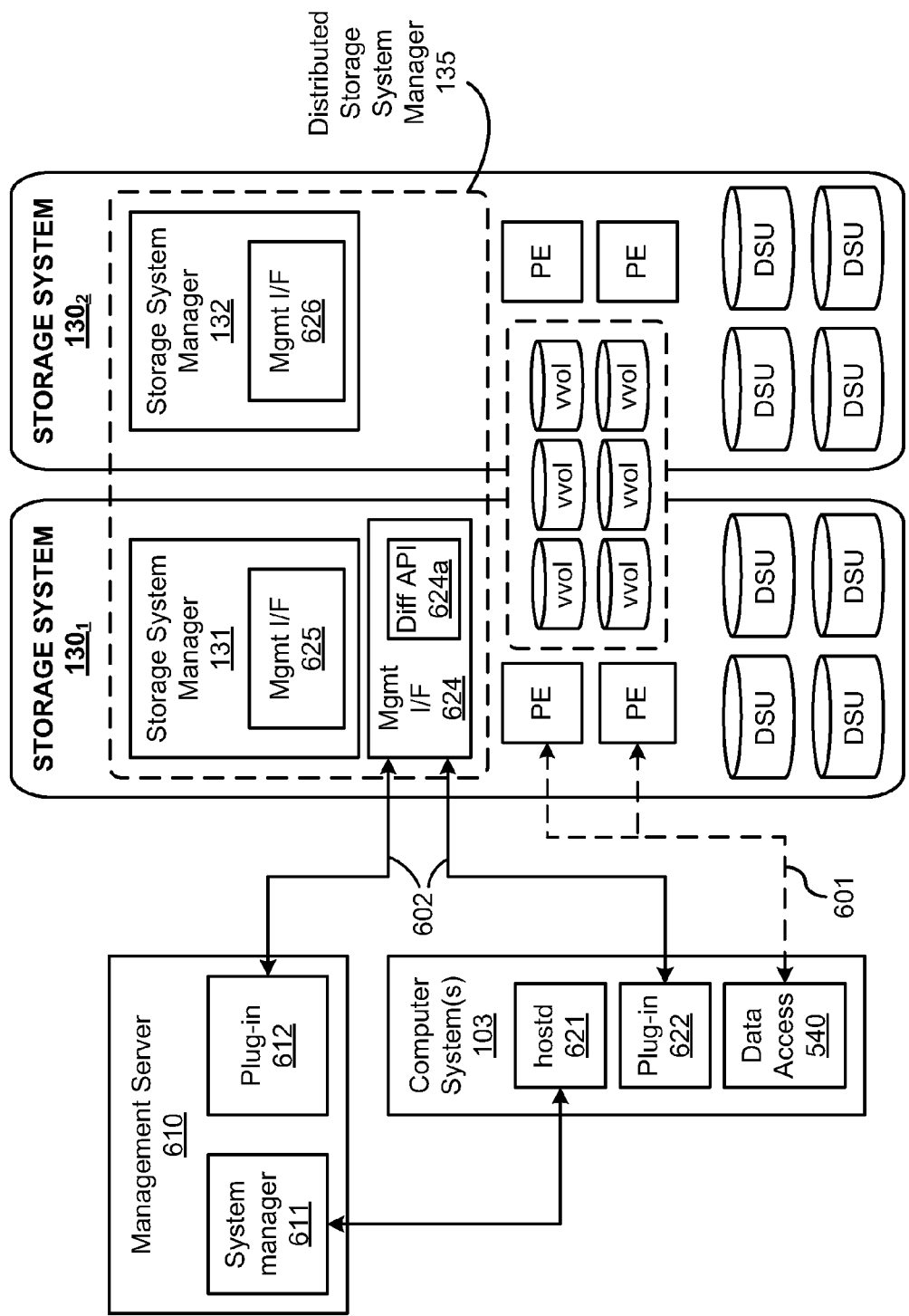
FIG. 6 illustrates a computer environment that depicts components and communication paths used to manage virtual volumes according to an embodiment.

FIGS. 2A and 2B are block diagrams of a storage system cluster that implements "virtual volumes" according to embodiments of the invention. The storage system cluster includes one or more storage systems, e.g., storage systems $130_1$ and $130_2$, which may be disk arrays, each having a plurality of data storage units (DSUs), one of which is labeled as 141 in the figures, and storage system managers 131 and 132 that control various operations of storage systems 130 to enable embodiments of the invention described herein. In one embodiment, two or more storage systems 130 may implement a distributed storage system manager 135 that controls the operations of the storage system cluster as if they were a single logical storage system. The operational domain of distributed storage system manager 135 may span storage systems installed in the same data center or across multiple data centers. For example, in one such embodiment, distributed storage system manager 135 may comprise storage system manager 131, which serves as a "master" manager when communicating with storage system manager 132, which serves as a "slave" manager, although it should be recognized that a variety of alternative methods to implement a distributed storage system manager may be implemented. DSUs represent physical storage units, e.g., disk or flash based storage units such as rotating disks or solid state disks. According to embodiments, the storage system cluster creates and exposes "virtual volumes" (vvols), as further detailed herein, to connected computer systems, such as computer systems $100_1$ and $100_2$. Applications (e.g., VMs accessing their virtual disks, etc.) running in computer systems 100 access the vvols on demand using standard protocols, such as SCSI in the embodiment of FIG. 2A and NFS in the embodiment of FIG. 2B, through logical endpoints for the SCSI or NFS protocol traffic, known as "protocol endpoints" (PEs), that are configured in storage systems 130. The communication path for application-related data operations from computer systems 100 to the storage systems 130 is referred to herein as an "in-band" path. Communication paths between host bus adapters (HBAs) of computer systems 100 and PEs configured in storage systems 130 and between network interface cards (NICs) of computer systems 100 and PEs configured in storage systems 130 are examples of in-band paths. Communication paths from computer systems 100 to storage systems 130 that are not in-band, and that are typically used to carry out management operations, are referred to herein as an "out-of-band" path. Examples of out-of-band paths, such as an Ethernet network connection between computer systems 100 and storage systems 130, are illustrated in FIG. 6 separately from the in-band paths. For simplicity, computer systems 100 are shown to be directly connected to storage systems 130. However, it should be understood that they may be connected to storage systems 130 through multiple paths and one or more switches.

Distributed storage system manager 135 or a single storage system manager 131 or 132 may create vvols (e.g., upon request of a computer system 100, etc.) from logical "storage containers," which represent a logical aggregation of physical DSUs. In general, a storage container may span more than one storage system and many storage containers may be created by a single storage system manager or a distributed storage system manager. Similarly, a single storage system may contain many storage containers. In FIGS. 2A and 2B, storage container $142_A$ created by distributed storage system manager 135 is shown as spanning storage system $130_1$ and storage system $130_2$, whereas storage container $142_B$ and storage container $142_C$ are shown as being contained within a single storage system (i.e., storage system $130_1$ and storage system $130_2$, respectively). It should be recognized that, because a storage container can span more than one storage system, a storage system administrator can provision to its customers a storage capacity that exceeds the storage capacity of any one storage system. It should be further recognized that, because multiple storage containers can be created within a single storage system, the storage system administrator can provision storage to multiple customers using a single storage system.

In the embodiment of FIG. 2A, each vvol is provisioned from a block based storage system. In the embodiment of FIG. 2B, a NAS based storage system implements a file system 145 on top of DSUs 141 and each vvol is exposed to computer systems 100 as a file object within this file system. In addition, as will be described in further detail below, applications running on computer systems 100 access vvols for IO through PEs. For example, as illustrated in dashed lines in FIGS. 2A and 2B, vvol 151 and vvol 152 are accessible via PE 161; vvol 153 and vvol 155 are accessible via PE 162; vvol 154 is accessible via PE 163 and PE 164; and vvol 156 is accessible via PE 165. It should be recognized that vvols from multiple storage containers, such as vvol 153 in storage container $142_A$ and vvol 155 in storage container $142_C$, may be accessible via a single PE, such as PE 162, at any given time. It should further be recognized that PEs, such as PE 166, may exist in the absence of any vvols that are accessible via them.

In the embodiment of FIG. 2A, storage systems 130 implement PEs as a special type of LUN using known methods for setting up LUNs. As with LUNs, a storage system 130 provides each PE a unique identifier known as a WWN (World Wide Name). In one embodiment, when creating the PEs, storage system 130 does not specify a size for the special LUN because the PEs described herein are not actual data containers. In one such embodiment, storage system 130 may assign a zero value or a very small value as the size of a PE-related LUN such that administrators can quickly identify PEs when requesting that a storage system provide a list of LUNs (e.g., traditional data LUNs and PE-related LUNs), as further discussed below. Similarly, storage system 130 may assign a LUN number greater than 255 as the identifying number for the LUN to the PEs to indicate, in a human-friendly way, that they are not data LUNs. As another way to distinguish between the PEs and LUNs, a PE bit may be added to the Extended Inquiry Data VPD page (page 86h). The PE bit is set to 1 when a LUN is a PE, and to 0 when it is a regular data LUN. Computer systems 100 may discover the PEs via the in-band path by issuing a SCSI command REPORT_LUNS and determine whether they are PEs according to embodiments described herein or conventional data LUNs by examining the indicated PE bit. Computer systems 100 may optionally inspect the LUN size and LUN number properties to further confirm whether the LUN is a PE or a conventional LUN. It should be recognized that any one of the techniques described above may be used to distinguish a PE-related LUN from a regular data LUN. In one embodiment, the PE bit technique is the only technique that is used to distinguish a PE-related LUN from a regular data LUN.

In the embodiment of FIG. 2B, the PEs are created in storage systems 130 using known methods for setting up mount points to FS volumes. Each PE that is created in the embodiment of FIG. 2B is identified uniquely by an IP address and file system path, also conventionally referred together as a "mount point." However, unlike conventional mount points, the PEs are not associated with FS volumes. In addition, unlike the PEs of FIG. 2A, the PEs of FIG. 2B are not discoverable by computer systems 100 via the in-band path unless virtual volumes are bound to a given PE. Therefore, the PEs of FIG. 2B are reported by the storage system via the out-of-band path.

Figure 3:
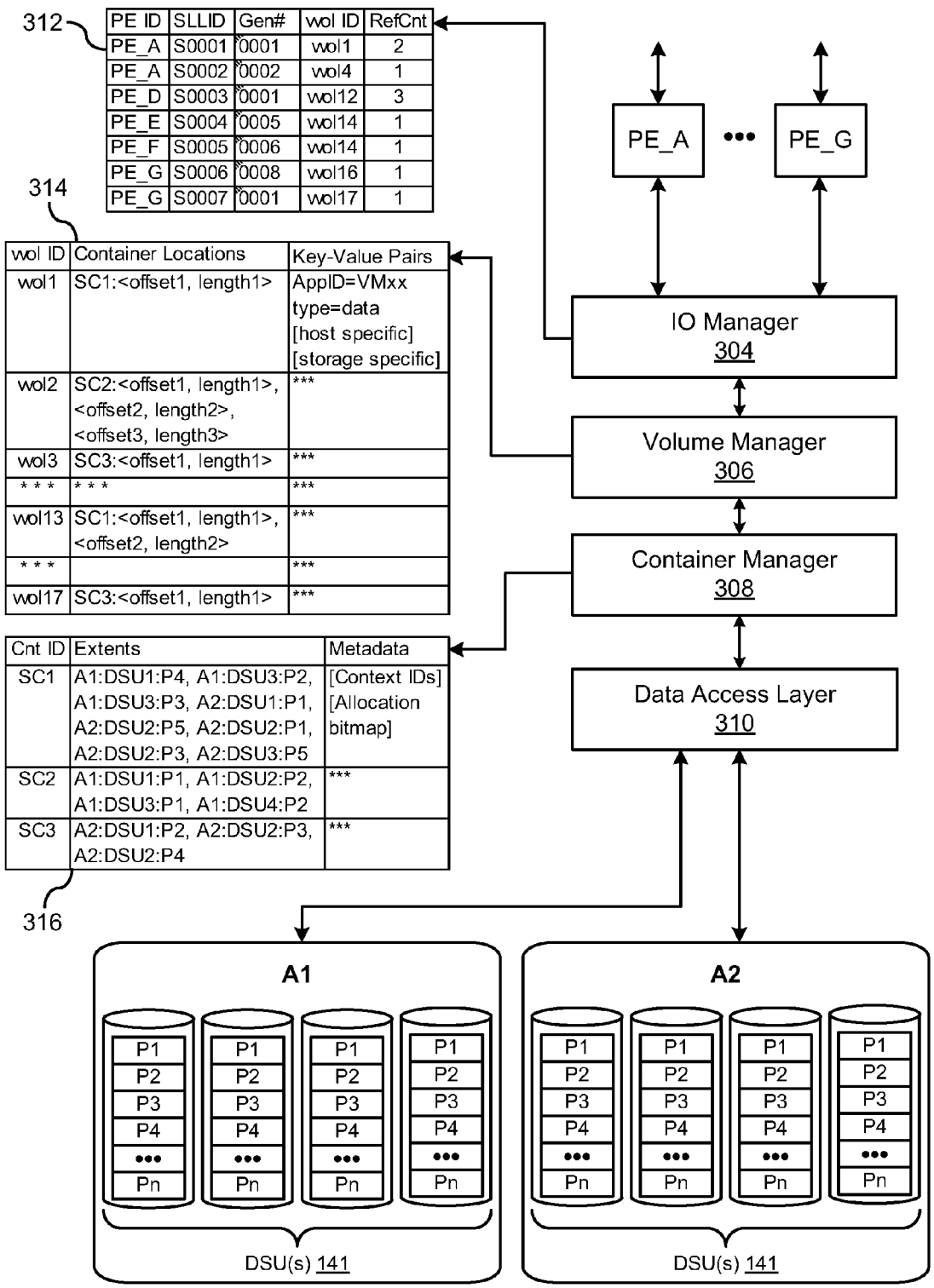
FIG. 3 illustrates components of the storage system cluster of FIG. 2A or 2B for managing virtual volumes.

FIG. 3 is a block diagram of components of the storage system cluster of FIG. 2A or 2B for managing virtual volumes, according to an embodiment. The components include software modules of storage system managers 131 and 132 executing in storage systems 130 in one embodiment or software modules of distributed storage system manager 135 in another embodiment, namely an input/output (I/O) manager 304, a volume manager 306, a container manager 308, and a data access layer 310. As described herein, actions taken by distributed storage system manager 135 may be taken by storage system manager 131 or storage system manager 132 depending on the embodiment.

In the example of FIG. 3, distributed storage system manager 135 has created three storage containers SC1, SC2, and SC3 from DSUs 141, each of which is shown to have spindle extents labeled P1 through Pn. In general, each storage container has a fixed physical size, and is associated with specific extents of DSUs. In the example shown in FIG. 3, distributed storage system manager 135 has access to a container database 316 that stores for each storage container, its container ID, physical layout information and some metadata. Container database 316 is managed and updated by a container manager 308, which in one embodiment is a component of distributed storage system manager 135. The container ID is a universally unique identifier that is given to the storage container when the storage container is created. Physical layout information consists of the spindle extents of DSUs 141 that are associated with the given storage container and stored as an ordered list of <system ID, DSU ID, extent number>. The metadata section may contain some common and some storage system vendor specific metadata. For example, the metadata section may contain the IDs of computer systems or applications or users that are permitted to access the storage container. As another example, the metadata section contains an allocation bitmap to denote which <system ID, DSU ID, extent number> extents of the storage container are already allocated to existing vvols and which ones are free. In one embodiment, a storage system administrator may create separate storage containers for different business units so that vvols of different business units are not provisioned from the same storage container. Other policies for segregating vvols may be applied. For example, a storage system administrator may adopt a policy that vvols of different customers of a cloud service are to be provisioned from different storage containers. Also, vvols may be grouped and provisioned from storage containers according to their required service levels. In addition, a storage system administrator may create, delete, and otherwise manage storage containers, such as defining the number of storage containers that can be created and setting the maximum physical size that can be set per storage container.

Also, in the example of FIG. 3, distributed storage system manager 135 has provisioned (on behalf of requesting computer systems 100) multiple vvols, each from a different storage container. In general, vvols may have a fixed physical size or may be thinly provisioned such that storage space is dynamically allocated to the vvols when such storage space is actually needed and not necessarily when the vvol is initial created. Further, each vvol may have a vvol ID, which is a universally unique identifier that is given to the vvol when the vvol is created. For each vvol, a vvol database 314 stores for each vvol, its vvol ID, the container ID of the storage container in which the vvol is created, and an ordered list of <offset, length> values within that storage container that comprise the address space of the vvol. Vvol database 314 is managed and updated by volume manager 306, which may be a component of distributed storage system manager 135. In one embodiment, vvol database 314 also stores metadata about the vvol, e.g., as a set of key-value pairs. Computer systems 100 may update and query such metadata via the out-of-band path at any time during the vvol's existence. The key-value pairs fall into different general categories. For example, a first category may include well-known keys—the definition of certain keys (and hence the interpretation of their values) are publicly available. One example is a key that corresponds to the virtual volume type (e.g., in virtual machine embodiments, whether the vvol contains a VM's metadata or a VM's data). Another example is the App ID, which is the ID of the application that stored data in the vvol. A second category includes computer system specific keys—the computer system or its management module stores certain keys and values as the virtual volume's metadata. A third category includes storage system vendor specific keys—these allow the storage system vendor to store certain keys associated with the virtual volume's metadata. One reason for a storage system vendor to use this key-value store for its metadata is that all of these keys are readily available to storage system vendor plug-ins and other extensions via the out-of-band channel for vvols. The store operations for key-value pairs are part of virtual volume creation and other processes, and thus the store operation should be reasonably fast. Storage systems are also configured to enable searches of virtual volumes based on exact matches to values provided on specific keys.

IO manager 304 is a software module (also, in certain embodiments, a component of distributed storage system manager 135) that maintains a connection database 312 that stores currently valid IO connection paths between PEs and vvols. In the example shown in FIG. 3, seven currently valid IO sessions are shown. Each valid session has an associated PE ID, secondary level identifier (SLLID), vvol ID, and reference count (RefCnt) indicating the number of different applications that are performing IO through this O session. The process of establishing a valid IO session between a PE and a vvol by distributed storage system manager 135 (e.g., on request by a computer system 100) is referred to herein as a "bind" process. For each bind, distributed storage system manager 135 (e.g., via IO manager 304) adds an entry to connection database 312. The process of subsequently tearing down the IO session by distributed storage system manager 135 is referred to herein as an "unbind" process. For each unbind, distributed storage system manager 135 (e.g., via IO manager 304) decrements the reference count of the IO session by one. When the reference count of an IO session is at zero, distributed storage system manager 135 (e.g., via IO manager 304) may delete the entry for that IO connection path from connection database 312. As previously discussed, in one embodiment, computer systems 100 generate and transmit bind and unbind requests via the out-of-band path to distributed storage system manager 135. Alternatively, computer systems 100 may generate and transmit unbind requests via an in-band path by overloading existing error paths. In one embodiment, the generation number is changed to a monotonically increasing number or a randomly generated number, when the reference count changes from 0 to 1 or vice versa. In another embodiment, the generation number is a randomly generated number and the RefCnt column is eliminated from connection database 312, and for each bind, even when the bind request is to a vvol that is already bound, distributed storage system manager 135 (e.g., via IO manager 304) adds an entry to connection database 312.

In the storage system cluster of FIG. 2A, IO manager 304 processes IO requests (IOs) from computer systems 100 received through the PEs using connection database 312. When an IO is received at one of the PEs, IO manager 304 parses the IO to identify the PE ID and the SLLID contained in the IO in order to determine a vvol for which the IO was intended. By accessing connection database 314, IO manager 304 is then able to retrieve the vvol ID associated with the parsed PE ID and SLLID. In FIG. 3 and subsequent figures, PE ID is shown as PE_A, PE_B, etc. for simplicity. In one embodiment, the actual PE IDs are the WWNs of the PEs. In addition, SLLID is shown as S0001, S0002, etc. The actual SLLIDs are generated by distributed storage system manager 135 as any unique number among SLLIDs associated with a given PE ID in connection database 312. The mapping between the logical address space of the virtual volume having the vvol ID and the physical locations of DSUs 141 is carried out by volume manager 306 using vvol database 314 and by container manager 308 using container database 316. Once the physical locations of DSUs 141 have been obtained, data access layer 310 (in one embodiment, also a component of distributed storage system manager 135) performs IO on these physical locations.

In the storage system cluster of FIG. 2B, IOs are received through the PEs and each such IO includes an NFS handle (or similar file system handle) to which the IO has been issued. In one embodiment, connection database 312 for such a system contains the IP address of the NFS interface of the storage system as the PE ID and the file system path as the SLLID. The SLLIDs are generated based on the location of the vvol in the file system 145. The mapping between the logical address space of the vvol and the physical locations of DSUs 141 is carried out by volume manager 306 using vvol database 314 and by container manager 308 using container database 316. Once the physical locations of DSUs 141 have been obtained, data access layer performs IO on these physical locations. It should be recognized that for a storage system of FIG. 2B, container database 312 may contain an ordered list of file: <offset, length> entries in the Container Locations entry for a given vvol (i.e., a vvol can be comprised of multiple file segments that are stored in the file system 145).

In one embodiment, connection database 312 is maintained in volatile memory while vvol database 314 and container database 316 are maintained in persistent storage, such as DSUs 141. In other embodiments, databases 312, 314, 316 may be maintained in persistent storage.

Figure 4:
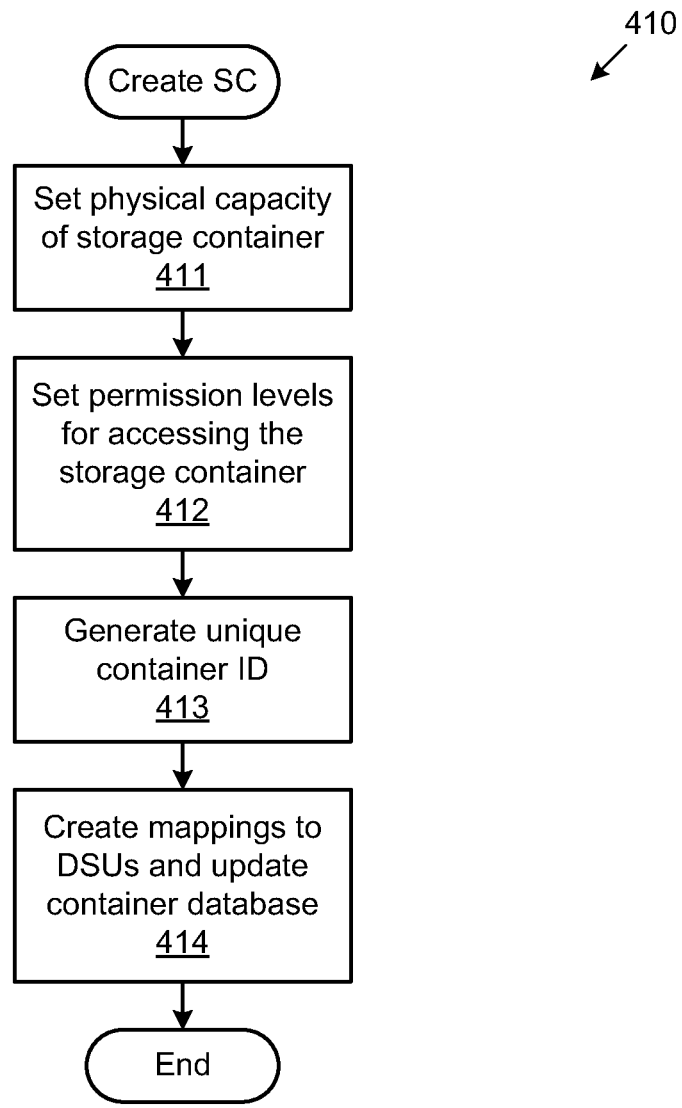
FIG. 4 illustrates method steps for creating a storage container.

FIG. 4 illustrates method steps 410 for creating a storage container. In one embodiment, steps 410 are carried out by storage system manager 131, storage system manager 132, or distributed storage system manager 135 under control of a storage administrator. As noted above, a storage container represents a logical aggregation of physical DSUs and may span physical DSUs from more than one storage system. At step 411, the storage administrator (via distributed storage system manager 135, etc.) sets a physical capacity of a storage container. Within a cloud or data center, this physical capacity may, for example, represent the amount of physical storage that is leased by a customer. The flexibility provided by storage containers disclosed herein is that storage containers of different customers can be provisioned by a storage administrator from the same storage system and a storage container for a single customer can be provisioned from multiple storage systems, e.g., in cases where the physical capacity of any one storage device is not sufficient to meet the size requested by the customer, or in cases such as replication where the physical storage footprint of a vvol will naturally span multiple storage systems. At step 412, the storage administrator sets permission levels for accessing the storage container. In a multi-tenant data center, for example, a customer may only access the storage container that has been leased to him or her. At step 413, distributed storage system manager 135 generates a unique identifier for the storage container. Then, at step 414, distributed storage system manager 135 (e.g., via container manager 308 in one embodiment) allocates free spindle extents of DSUs 141 to the storage container in sufficient quantities to meet the physical capacity set at step 411. As noted above, in cases where the free space of any one storage system is not sufficient to meet the physical capacity, distributed storage system manager 135 may allocate spindle extents of DSUs 141 from multiple storage systems. After the partitions have been allocated, distributed storage system manager 135 (e.g., via container manager 308) updates container database 316 with the unique container ID, an ordered list of <system number, DSU ID, extent number>, and context IDs of computer systems that are permitted to access the storage container.

Storage capability profiles, e.g., SLAs or quality of service (QoS), may be configured by distributed storage system manager 135 (e.g., on behalf of requesting computer systems 100) on a per vvol basis. Therefore, vvols with different storage capability profiles may be part of the same storage container. In one embodiment, a system administrator defines a default storage capability profile (or a number of possible storage capability profiles) for newly created vvols at the time of creation of the storage container and stored in the metadata section of container database 316. If a storage capability profile is not explicitly specified for a new vvol being created inside a storage container, the new vvol inherits the default storage capability profile associated with the storage container.

Figure 5A:
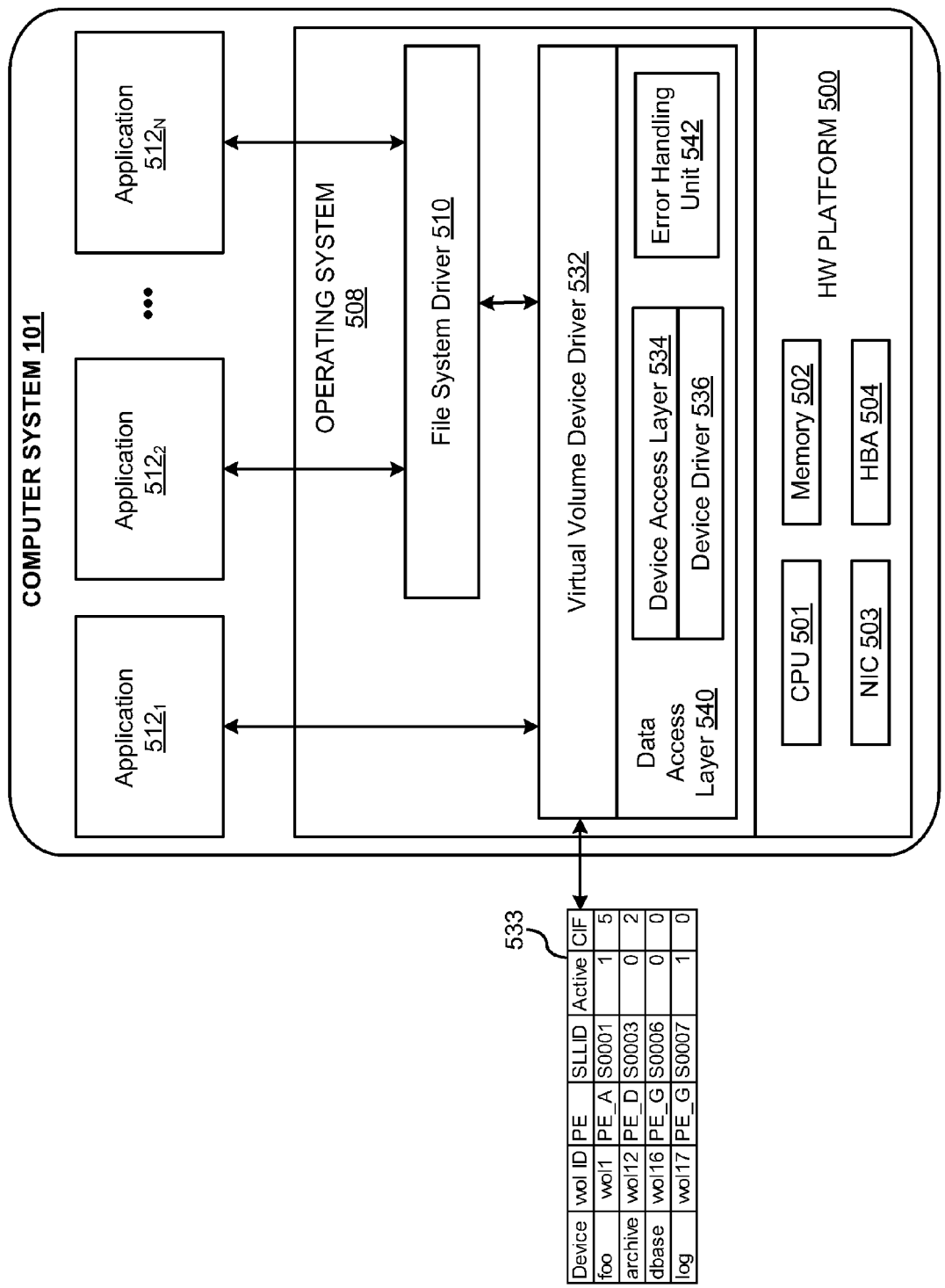
FIG. 5A illustrates an embodiment of a computer system configured to implement virtual volumes hosted on a SAN-based storage system.

FIG. 5A is a block diagram of a computer system configured to implement virtual volumes hosted on a storage system cluster of FIG. 2A. Computer system 101 may be constructed on a conventional, typically server-class, hardware platform 500 that includes one or more central processing units (CPU) 501, memory 502, one or more network interface cards (NIC) 503, and one or more host bus adapters (HBA) 504. HBA 504 enables computer system 101 to issue IOs to virtual volumes through PEs configured in storage devices 130. As further shown in FIG. 5A, operating system 508 is installed on top of hardware platform 500 and a number of applications $512_1$-$512_N$ are executed on top of operating system 508. Examples of operating system 508 include any of the well-known commodity operating systems, such as Microsoft Windows, Linux, and the like.

Each application 512 has one or more vvols associated therewith and issues IOs to block device instances of the vvols created by operating system 508, e.g., pursuant to "CREATE DEVICE" calls by application 512 to operating system 508. The association between block device names and vvol IDs are maintained in block device database 533. File system driver 510 converts IOs received from applications $512_2$-$512_N$ to block IOs, and provides the block IOs to a virtual volume device driver 532. In contrast, IO operations from application $512_1$ bypass file system driver 510 and are provided directly to virtual volume device driver 532. This signifies that application $512_1$ accesses its block device directly as a raw storage device, e.g., as a database disk, a log disk, a backup archive, and a content repository, in the manner described in U.S. Pat. No. 7,155,558 entitled "Providing Access to a Raw Data Storage Unit in a Computer System," the entire contents of which are incorporated by reference herein. When virtual volume device driver 532 receives a block IO, it accesses block device database 533 to reference a mapping between the block device name specified in the IO and the PE ID (WWN of PE LUN) and SLLID that define the IO connection path to the vvol associated with the block device name. In the example shown herein, the block device name, archive, corresponds to a block device instance of vvol12 that was created for application $512_1$, and the block device names, foo, dbase, and log, correspond to block device instances of vvol1, vvol16, and vvol17, respectively, that were created for one or more of applications $512_2$-$512_N$. Other information that is stored in block device database 533 includes an active bit value for each block device that indicates whether or not the block device is active, and a CIF (commands-in-flight) value. An active bit of "1" signifies that IOs can be issued to the block device. An active bit of "0" signifies that the block device is inactive and IOs cannot be issued to the block device. The CIF value provides an indication of how many IOs are in flight, i.e., issued but not completed. In the example shown herein, the block device, foo, is active, and has some commands-in-flight. The block device, archive, is inactive, and will not accept newer commands. However, in the example, it is waiting for 2 commands-in-flight to complete. The block device, dbase, is inactive with no outstanding commands. Finally, the block device, log, is active, but the application currently has no pending IOs to the device. Virtual volume device driver 532 may choose to remove such devices from its database 533 at any time.

In addition to performing the mapping described above, virtual volume device driver 532 issues raw block-level IOs to data access layer 540. Data access layer 540 includes device access layer 534, which applies command queuing and scheduling policies to the raw block-level IOs, and device driver 536 for HBA 504 which formats the raw block-level IOs in a protocol-compliant format and sends them to HBA 504 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The PE ID is encoded in the first 2 bytes, which is conventionally used for the LUN ID, and the vvol information, in particular the SLLID, is encoded in the SCSI second level LUN ID, utilizing (a portion of) the remaining 6 bytes.

As further shown in FIG. 5A, data access layer 540 includes an error handling unit 542 for handling IO errors that are received through the in-band path from the storage system. In one embodiment, the I/O manager 304 propagates IO errors received by error handling unit 542 through. Examples of IO error classes include path errors between computer system 101 and the PEs, PE errors, and vvol errors. The error handling unit 542 classifies all detected errors into aforementioned classes. For example, when a path error to a PE is encountered and another path to the PE exists, data access layer 540 transmits the IO along a different path to the PE. When the IO error is a PE error, error handing unit 542 updates block device database 533 to indicate an error condition for each block device issuing IOs through the PE. When the IO error is a vvol error, error handing unit 542 updates block device database 533 to indicate an error condition for each block device associated with the vvol. Error handing unit 542 may also issue an alarm or system event so that further IOs to block devices having the error condition will be rejected.

Figure 5B:
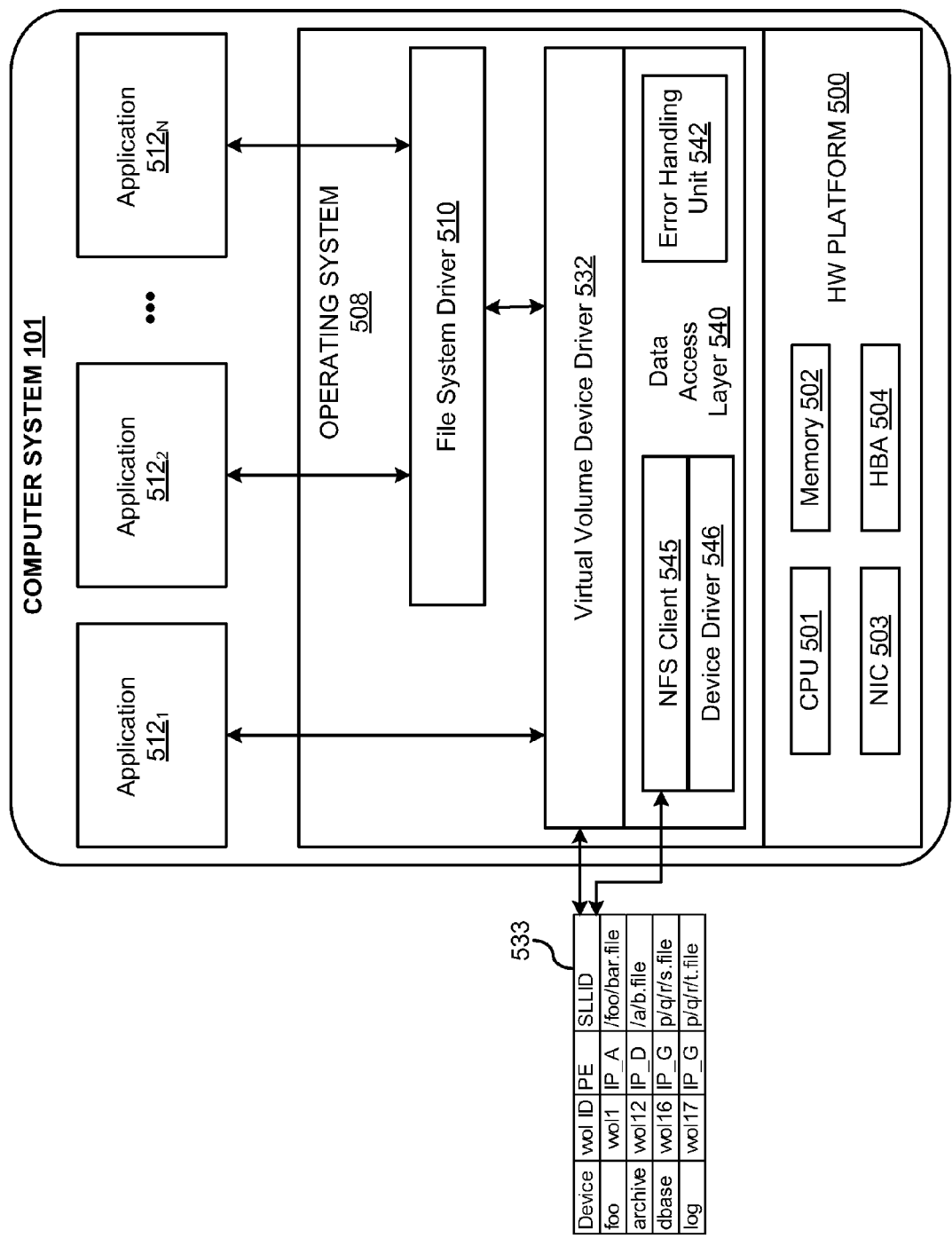
FIG. 5B illustrates the computer system of FIG. 5A configured for virtual volumes hosted on a NAS-based storage system.

FIG. 5B is a block diagram of the computer system of FIG. 5A configured to interface with the storage system cluster of FIG. 2B instead of the storage system cluster of FIG. 2A. In this embodiment, data access layer 540 includes an NFS client 545 and a device driver 546 for NIC 503. NFS client 545 maps the block device name to a PE ID (IP address of NAS storage system) and a SLLID which is a NFS file handle corresponding to the block device. This mapping is stored in block device database 533 as shown in FIG. 5B. It should be noted that the Active and CIF columns are still present but not illustrated in the block device database 533 shown in FIG. 5B. As will be described below, an NFS file handle uniquely identifies a file object within the NAS storage system, and may be generated during the bind process. Alternatively, in response to a request to bind the vvol, the NAS storage system returns the PE ID and the SLLID, and an open of the vvol using regular in-band mechanisms (e.g., lookup or readdirplus) gives the NFS file handle. NFS client 545 also translates the raw block-level IOs received from virtual volume device driver 532 to NFS file-based IOs. Device driver 546 for NIC 503 then formats the NFS file-based IOs in a protocol-compliant format and sends them to NIC 503, along with the NFS handle, for forwarding to one of the PEs via an in-band path.

Figure 5C:
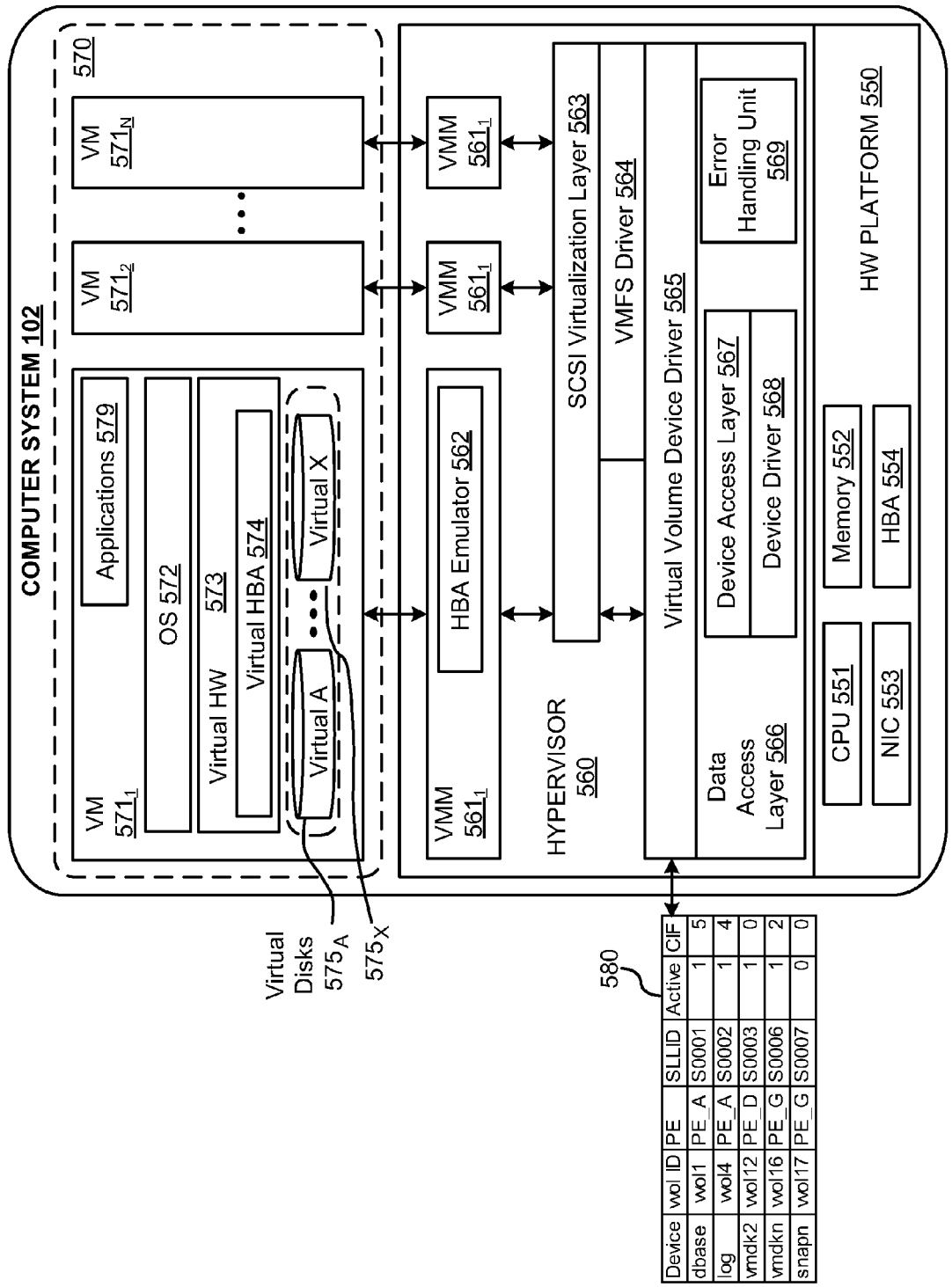
FIG. 5C illustrates another embodiment of a computer system configured to implement virtual volumes hosted on a SAN-based storage system.

FIG. 5C is a block diagram of another embodiment of a computer system configured to implement virtual volumes. In this embodiment, computer system 102 is configured with virtualization software, shown herein as hypervisor 560. Hypervisor 560 is installed on top of hardware platform 550, which includes CPU 551, memory 552, NIC 553, and HBA 554, and supports a virtual machine execution space 570 within which multiple virtual machines (VMs) $571_1$-$571_N$ may be concurrently instantiated and executed. In one embodiment, hypervisor 560 and virtual machines 571 are implemented using the VMware vSphere® product distributed by VMware, Inc. of Palo Alto, Calif. Each virtual machine 571 implements a virtual hardware platform 573 that supports the installation of a guest operating system (OS) 572 which is capable of executing applications 579. Examples of a guest OS 572 include any of the well-known commodity operating systems, such as Microsoft Windows, Linux, and the like. In each instance, guest OS 572 includes a native file system layer (not shown in FIG. 5C), for example, either an NTFS or an ext3FS type file system layer. These file system layers interface with virtual hardware platforms 573 to access, from the perspective of guest OS 572, a data storage HBA, which in reality, is virtual HBA 574 implemented by virtual hardware platform 573 that provides the appearance of disk storage support (in reality, virtual disks or virtual disks $575_A$-$575_X$) to enable execution of guest OS 572. In certain embodiments, virtual disks $575_A$-$575_X$ may appear to support, from the perspective of guest OS 572, the SCSI standard for connecting to the virtual machine or any other appropriate hardware connection interface standard known to those with ordinary skill in the art, including IDE, ATA, and ATAPI. Although, from the perspective of guest OS 572, file system calls initiated by such guest OS 572 to implement file system-related data transfer and control operations appear to be routed to virtual disks $575_A$-$575_X$ for final execution, in reality, such calls are processed and passed through virtual HBA 574 to adjunct virtual machine monitors (VMM) $561_1$-$561_N$ that implement the virtual system support needed to coordinate operation with hypervisor 560. In particular, HBA emulator 562 functionally enables the data transfer and control operations to be correctly handled by hypervisor 560 which ultimately passes such operations through its various layers to HBA 554 that connect to storage systems 130.

In some embodiments, each VM 571 has one or more vvols associated therewith and issues IOs to block device instances of the vvols created by hypervisor 560 pursuant to "CREATE DEVICE" calls by VM 571 into hypervisor 560. The block device database 580 maintains associations between block device names and vvol IDs. IOs from VMs $571_2$-$571_N$ are received by a SCSI virtualization layer 563, which converts them into file IOs understood by a virtual machine file system (VMFS) driver 564. VMFS driver 564 then converts the file IOs to block IOs, and provides the block IOs to virtual volume device driver 565. IOs from VM $571_1$, on the other hand, are shown to bypass VMFS driver 564 and provided directly to virtual volume device driver 565, signifying that VM $571_1$ accesses its block device directly as a raw storage device, e.g., as a database disk, a log disk, a backup archive, and a content repository, in the manner described in U.S. Pat. No. 7,155,558.

When virtual volume device driver 565 receives a block IO, it accesses block device database 580 to reference a mapping between the block device name specified in the IO and the PE ID and SLLID that define the IO session to the vvol associated with the block device name. In the example shown herein, the block device names, dbase and log, corresponds to block device instances of vvol1 and vvol4, respectively, that were created for VM $571_1$, and the block device names, vmdk2, vmdkn, and snapn, correspond to block device instances of vvol12, vvol16, and vvol17, respectively, that were created for one or more of VMs $571_2$-$571_N$. Other information that is stored in block device database 580 includes an active bit value for each block device that indicates whether or not the block device is active, and a CIF (commands-in-flight) value. An active bit of "1" signifies that IOs can be issued to the block device. An active bit of "0" signifies that the block device is inactive and IOs cannot be issued to the block device. The CIF value provides an indication of how many IOs are in flight, i.e., issued but not completed.

In addition to performing the mapping described above, virtual volume device driver 565 issues raw block-level IOs to data access layer 566. Data access layer 566 includes device access layer 567, which applies command queuing and scheduling policies to the raw block-level IOs, and device driver 568 for HBA 554 which formats the raw block-level IOs in a protocol-compliant format and sends them to HBA 554 for forwarding to the PEs via an in-band path. In the embodiment where SCSI protocol is used, the vvol information is encoded in the SCSI LUN data field, which is an 8-byte structure, as specified in SAM-5 (SCSI Architecture Model-5). The first 2 bytes, which are conventionally used for the LUN ID, encode the PE, and the SCSI second level LUN ID encode the vvol information, such as SLLID, utilizing (a portion of) the remaining 6 bytes. As further shown in FIG. 5C, data access layer 566 includes an error handling unit 569, which functions in the same manner as error handling unit 542.

Figure 5D:
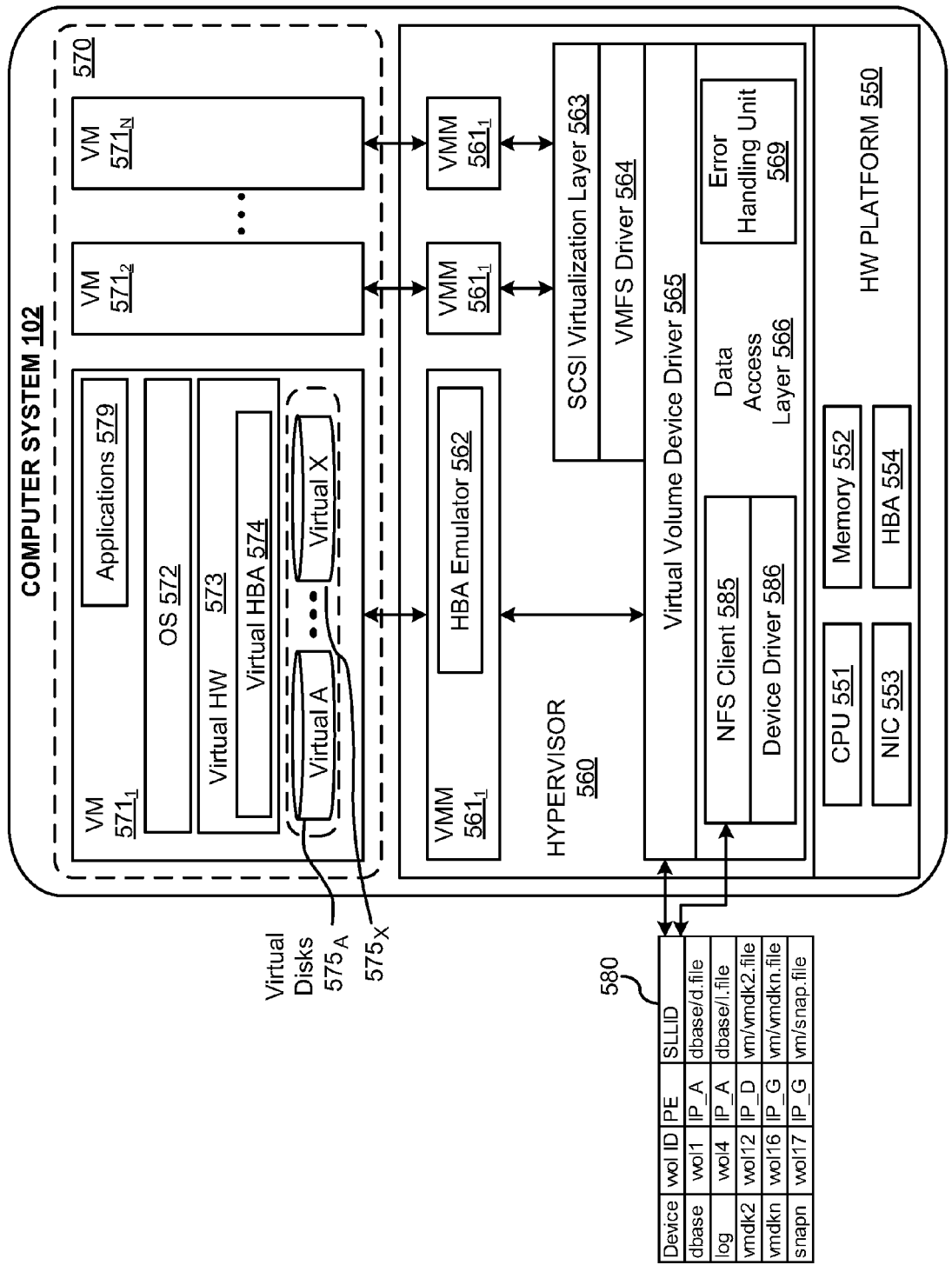
FIG. 5D illustrates the computer system of FIG. 5C configured for virtual volumes hosted on a NAS-based storage system.

FIG. 5D is a block diagram of the computer system of FIG. 5C that has been configured to interface with the storage system cluster of FIG. 2B instead of the storage system cluster of FIG. 2A. In this embodiment, data access layer 566 includes an NFS client 585 and a device driver 586 for NIC 553. NFS client 585 maps the block device name to a PE ID (IP address) and SLLID (NFS file handle) corresponding to the block device. This mapping is stored in block device database 580 as shown in FIG. 5D. It should be noted that the Active and CIF columns are still present but not illustrated in the block device database 580 shown in FIG. 5D. As will be described below, an NFS file handle uniquely identifies a file object within the NFS, and is generated during the bind process in one embodiment. NFS client 585 also translates the raw block-level IOs received from virtual volume device driver 565 to NFS file-based IOs. Device driver 586 for NIC 553 then formats the NFS file-based IOs in a protocol-compliant format and sends them to NIC 553, along with the NFS handle, for forwarding to one of the PEs via an in-band path.

One of skill in the art will recognize that the various terms, layers and categorizations used to describe the components in FIGS. 5A-5D may be referred to differently without departing from their functionality or the spirit or scope of the invention. For example, VMM 561 may be considered separate virtualization components between VM 571 and hypervisor 560 (which, in such a conception, may itself be considered a virtualization "kernel" component) since there exists a separate VMM for each instantiated VM. Alternatively, each VMM 561 may be considered to be a component of its corresponding virtual machine since such VMM includes the hardware emulation components for the virtual machine. In such an alternative conception, for example, the conceptual layer described as virtual hardware platform 573 may be merged with and into VMM 561 such that virtual host bus adapter 574 is removed from FIGS. 5C and 5D (i.e., since its functionality is effectuated by host bus adapter emulator 562).

FIG. 6 is a block diagram illustrating components and communication paths used to manage vvols according to an embodiment of the invention. As described, the communication path for IO protocol traffic is referred to as an in-band path. The in-band path 601 is shown in FIG. 6 as a dashed line that connects data access layer 540 of the computer system (through an HBA or NIC provided in the computer system) with one or more PEs configured in storage systems 130. The communication paths used to manage vvols are out-of-band paths (as previously defined, paths that are not "in-band") and shown in FIG. 6 as solid lines 602. According to embodiments described herein, vvols can be managed through plug-in 612 provided in management server 610 and/or plug-in 622 provided in each of computer systems 103, only one of which is shown in FIG. 6. On the storage device side, a management interface 625 is configured by storage system manager 131 and a management interface 626 is configured by storage system manager 132. In addition, a management interface 624 is configured by distributed storage system manager 135, which includes a difference API 624a. As discussed in greater detail below, the difference API 624a may be invoked to determine differences between vvols, which may then be used to clone a COW-based vvol hierarchy and to migrate the hierarchy to a redo-based disk hierarchy. In one embodiment, the storage system manager 135 may compare the two vvols based on copy-on-write information stored for a vvol hierarchy, and return a bitmap indicating data blocks that differ. Alternatively, the storage system manager 135 may compare the actual data of the two vvols.

Each management interface communicates with plug-ins 612, 622. To issue and handle management commands, application programming interfaces (APIs) may be provided. It should be recognized that, in one embodiment, both plug-ins 612, 622 are customized to communicate with storage hardware from a particular storage system vendor. Therefore, management server 610 and computer systems 103 will employ different plug-ins when communicating with storage hardware for different storage system vendors. In another embodiment, a single plug-in may interact with a given vendor's management interface. This requires the storage system manager to be programmed to a well-known interface (e.g., by virtue of being published by the computer system and/or the management server).

Management server 610 is further configured with a system manager 611 for managing the computer systems. In one embodiment, the computer systems are executing virtual machines and system manager 611 manages the virtual machines running in the computer systems. One example of system manager 611 that manages virtual machines is the vSphere® product distributed by VMware, Inc. As shown, system manager 611 communicates with a host daemon (hostd) 621 running in computer system 103 (through appropriate hardware interfaces at both management server 610 and computer system 103) to receive resource usage reports from computer system 103 and to initiate various management operations on applications running in computer system 103.

Figure 7:
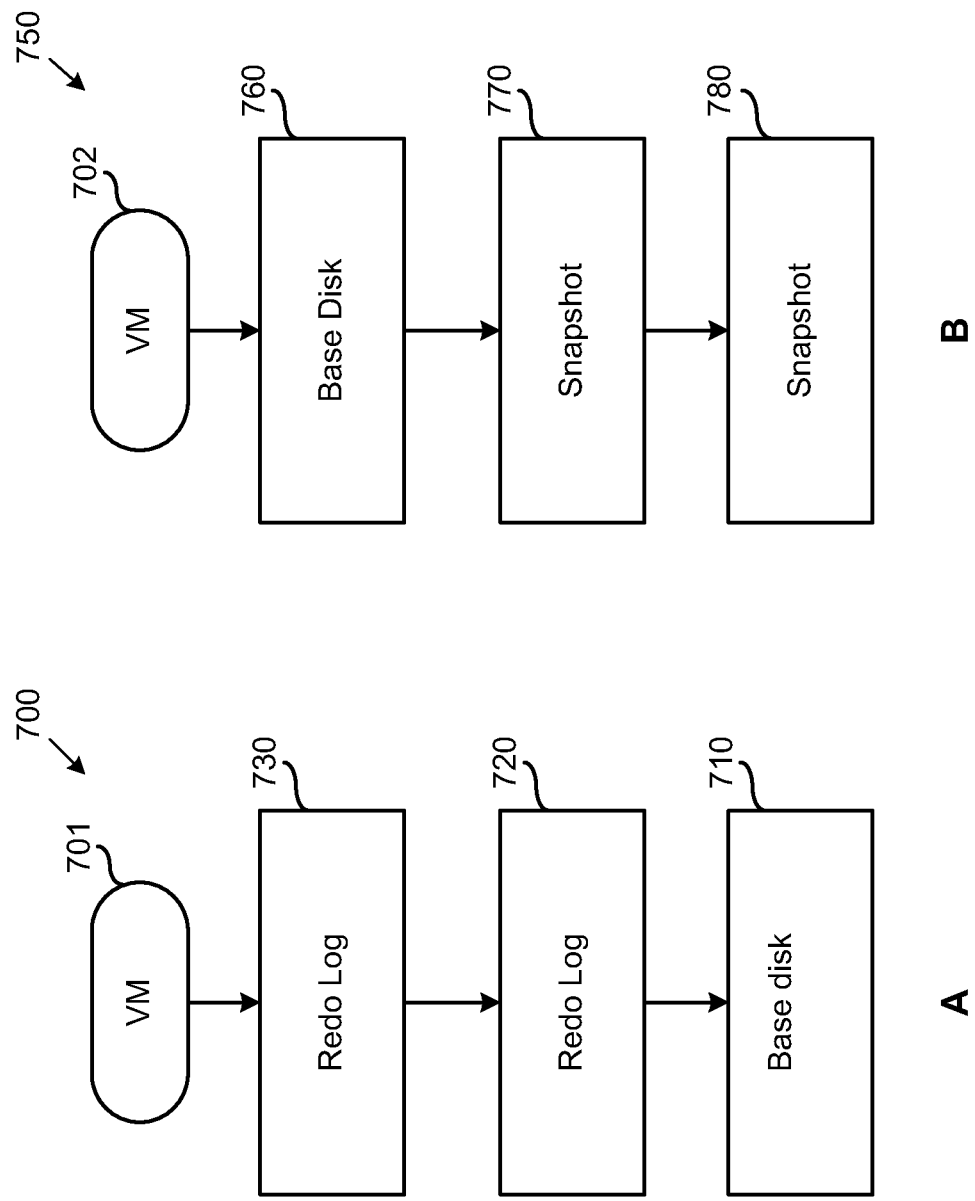
FIG. 7 illustrates differences between redo and copy-on-write snapshots.

FIG. 7 illustrates differences between redo and copy-on-write snapshots. As shown in panel A, a redo-based disk hierarchy 700 associated with a VM 701 includes a base disk 710 and redo logs 720-730. In general, a redo log may point to an immediately prior redo log, which points to another prior redo log, and so on, until the base disk is reached. As shown, the base disk 710 and redo log 720 are read only, while writes are performed to redo log 730. The chain of redo logs tracks differences between the base disk state and later disk states. IOs are made to the latest redo log, which is read-write, while reads not satisfied by the latest redo log are made to successively earlier redo logs and, if necessary, the base disk. That is, the current running point, to which IOs are made, is the latest redo log, and earlier redo logs and the base disk are accessed only if data stored therein and being requested is not available in later redo logs. Although only two redo logs are shown, additional redo logs may be created to capture the state of the virtual disk at various points in time.

As shown in panel B, a copy-on-write (COW) based hierarchy 750 includes base disk 760 and snapshot disks 770-780. Disks such as the base disk 760 and the snapshot disks 770-780 may be stored as vvols, discussed above. Under the COW approach, IOs are performed to base disk 760, i.e., the base disk 760 is the current running point, while snapshots 770-780 are maintained as mainly read-only point-in-time copies. Snapshots 770-780 are only written to when contents of base disk 706 are copied to snapshots 770-780 before being changed, thereby preserving the state of the virtual disk at previous times in snapshots 770-780. This approach is different from the redo-based approach, discussed above, so redo-based snapshots cannot be offloaded to COW-based storage systems.

Note, for linked clone VMs in particular, redo- and COW-based semantics may be bridged via fast cloning techniques, such as that provided by Citrix, Inc. As used herein, a "linked clone" is a duplicate of a parent VM that uses the same base disk as the parent VM, with a chain of redo logs to track the differences between the parent VM and the linked clone VM. Linked-cloning permits space-savings, as blocks are shared by multiple VMs. In order to achieve linked-clone functionality in COW-based storage devices, fast cloning technologies may be used, in which blocks are shared by reference-counting the blocks and allocating only different blocks.

Figure 8:
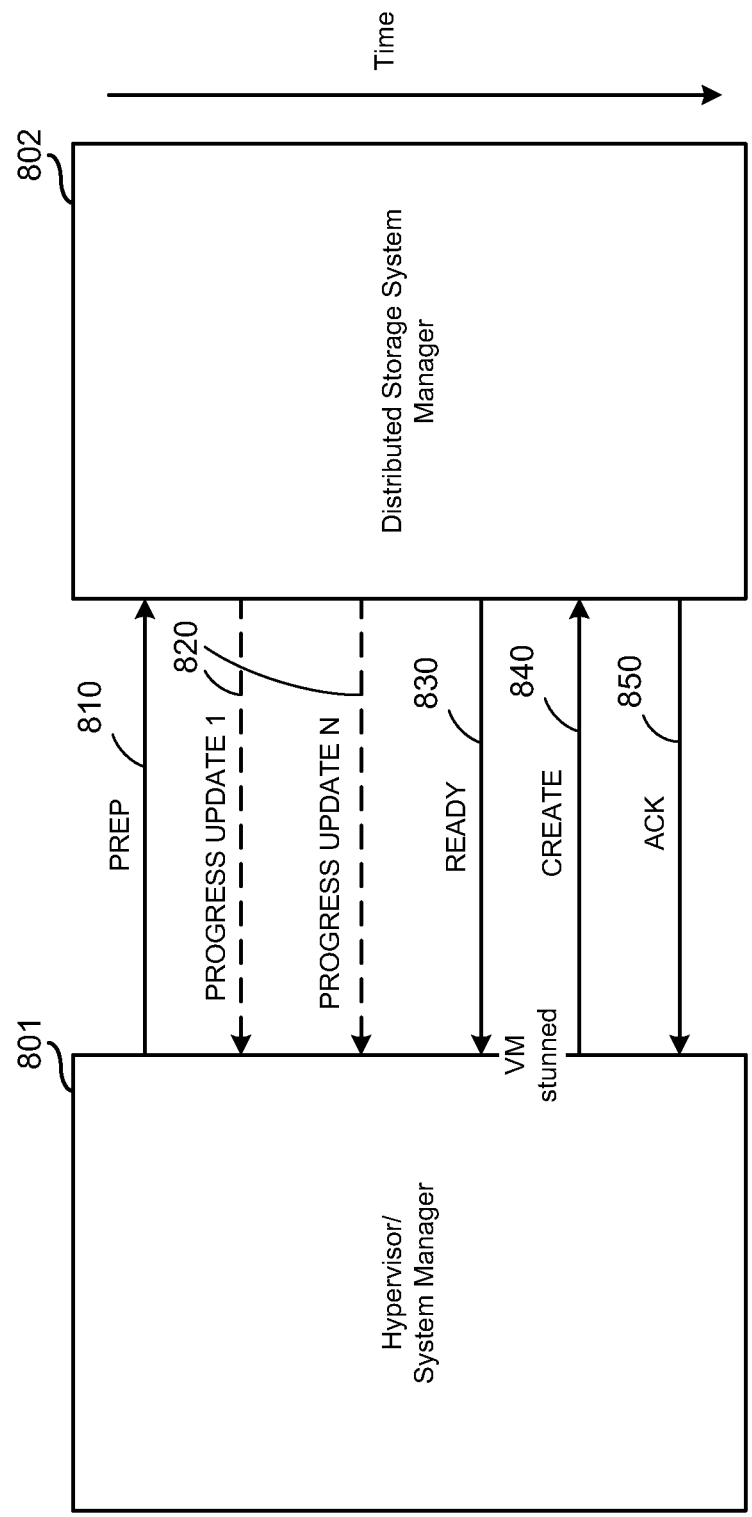
FIG. 8 illustrates an approach for taking vvol snapshots, according to an embodiment.

FIG. 8 illustrates an approach for taking vvol snapshots, according to an embodiment. The approach includes two phases: a preparation phase and a snapshot phase. In addition to semantic differences between COW and redo snapshots, snapshots involving vvols are not straightforward because the creation of snapshots may be offloaded to the storage system, vvol control path may be out-of-band, and the COW snapshot implementation may vary across storage systems and one cannot assume that it would be instantaneous (e.g., one common implementation requires walking the blocks of the disk being snapshotted to refCount, and causes the time to take a snapshot to increase linearly with the size of the disk). As a result, taking vvol snapshots may require more time than taking redo snapshots, in which a new redo log, an empty file, is created and written to. For virtual disks associated with VMs (e.g., VM $517_1$) in particular, a running VM may be stunned during the snapshot process to guarantee the synchronous nature of the VM. Stunning the VM may include, e.g., stopping vCPUs of the VM and marking the VM as non-executable, but the VM cannot be stunned for too long, or guest OS IOs may fail. In particular stunning causes VM downtime, and the VM may become unresponsive. Extended downtime is also undesirable for a number of other reasons. For example, the guest OS's clock is resynchronized on unstun, and a big jump in time may have an adverse effect on any guest/application IOs that are pending in the guest.

During the preparation phase, the hypervisor 560 or system manager 611 (which is to be understood as referring to one or more components of the hypervisor 560 and/or system manager 611) receives a request to take a snapshot of a particular VM, resolves the vvols associated with the VM according to techniques discussed above, and transmits a "PREP" message 810 notifying a storage system to prepare for the snapshot of the resolved vvols. In response to the "PREP" notification, the distributed storage system manager 135 asynchronously performs pre-processing and transmits update message(s) 820 back to the hypervisor about progress of the same. In one embodiment, the pre-processing may include taking a snapshot, which itself includes creating a COW snapshot vvol, while continuing to allow guest OS IOs to the current running point, i.e., the vvol to which IOs are being performed.

Once pre-processing is complete, the distributed storage system manager 135 transmits a "READY" message 830 notifying the hypervisor 560 or system manager 611 that the storage system 130 is ready to receive a snapshot command. After receiving such a notification, the hypervisor 560 or system manager 611 stuns the VM so that the snapshot operation may be performed synchronously. The hypervisor 560 or system manager 611 then creates a disk descriptor file for the snapshot vvol, which may include metadata information about the actual extents stored in the vvol such as the location of the vvol, the vvol ID, etc. Note, a virtual disk may generally comprise a disk descriptor file and a vvol object. After creating the disk descriptor file, the hypervisor 560 or system manager 611 issues a "CREATE" snapshot call, in response to which the distributed storage system manager 135 may transmit an "ACK" message 850 acknowledging the "CREATE" call with successful status. In one embodiment, distributed storage system manager 135 may return a temporary vvol ID that represents the snapshot in response to the "PREP" call. In such a case, the "CREATE" call may be passed this temporary ID, and distributed storage system manager 135 may then finalize the snapshot it set out to create when the "PREP" call was made. The finalized snapshot vvol ID may or may not be the same as the temporary one.

After receiving the acknowledgement, the hypervisor 560 or system manager 611 swizzles the newly created disk descriptor file for the snapshot vvol and a disk descriptor file for the base vvol. As discussed, the redo-based semantics of the hypervisor 560 or system manager 611 and the COW-based semantics of the system manager 611 may differ. As a result, the newly created disk descriptor file maintained by the hypervisor 560 that points to the newly-created snapshot vvol may be the redo log disk descriptor file. This association is incorrect, as both reads and writes are performed to the redo log, whereas the snapshot vvol is mainly read-only and may be stored in a storage pool optimized for read-only disks and therefore not optimal for writable redo logs. At the same time, the read-write base vvol may still be pointed to by a previous disk descriptor associated with a read-only base disk or redo log under the hypervisor 560 or system manager's 611 redo-based semantics. To correct this association, as well as the association of the newly created disk descriptor file with the newly created disk snapshot vvol, the disk descriptor files may be "swizzled."

Figure 9:
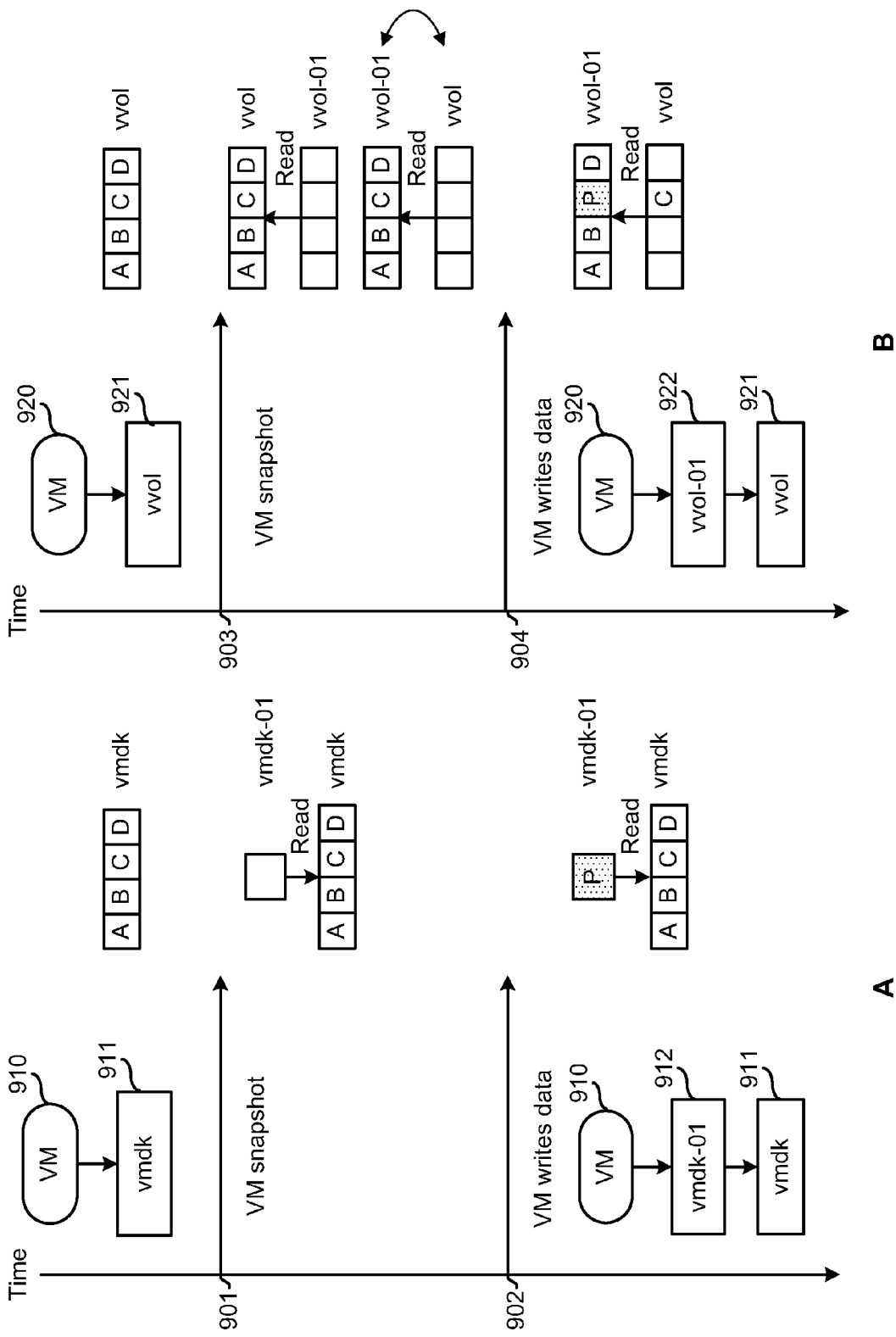
FIG. 9 illustrates an approach for swizzling disk descriptor files, according to an embodiment.

FIG. 9 illustrates an approach for swizzling disk descriptor files, according to an embodiment. Panel A shows a VM snapshot and a subsequent write operation using redo-based semantics. As shown, a VM 910 is associated with a virtual disk 911, which may be stored in, e.g., VMware's .vmdk format. At time 901, a snapshot is taken of VM 910, which includes creating a redo log 912 ("vmdk-01") that stores data written thereafter. As shown, the base disk 911 is read only, while writes may be performed to redo log 912. Illustratively, "P" is written to redo log 911 and stored therein at time 902.

As shown in panel B, a snapshot is taken at time 903, which, for distributed storage system manager 135, includes creating a snapshot vvol-01. Snapshot vvol-01 is read-only, and contents of base disk vvol 921 are copied to snapshot vvol-01 before being changed. As part of the snapshot process, the hypervisor 560 or system manager 611, which use redo-based semantics, updates disk descriptor files pointing to base disk vvol and delta dist vvol-01 such that the disk descriptor file for the redo base disk includes a pointer to the COW snapshot vvol, and the disk descriptor file for the (latest) redo log points to the base vvol-01. This operation is referred to herein as "swizzling" the disk descriptor files, and may be by, e.g., updating metadata "vvol ID" values in the disk descriptor files to specify the appropriate vvols. At time 904, when the VM 940 writes data to the redo log 922, the data is written to the base vvol, as opposed to the snapshot vvol. Illustratively, "P" is written to vvol-01, and a copy of "C" is made to the snapshot vvol.

Figure 10:
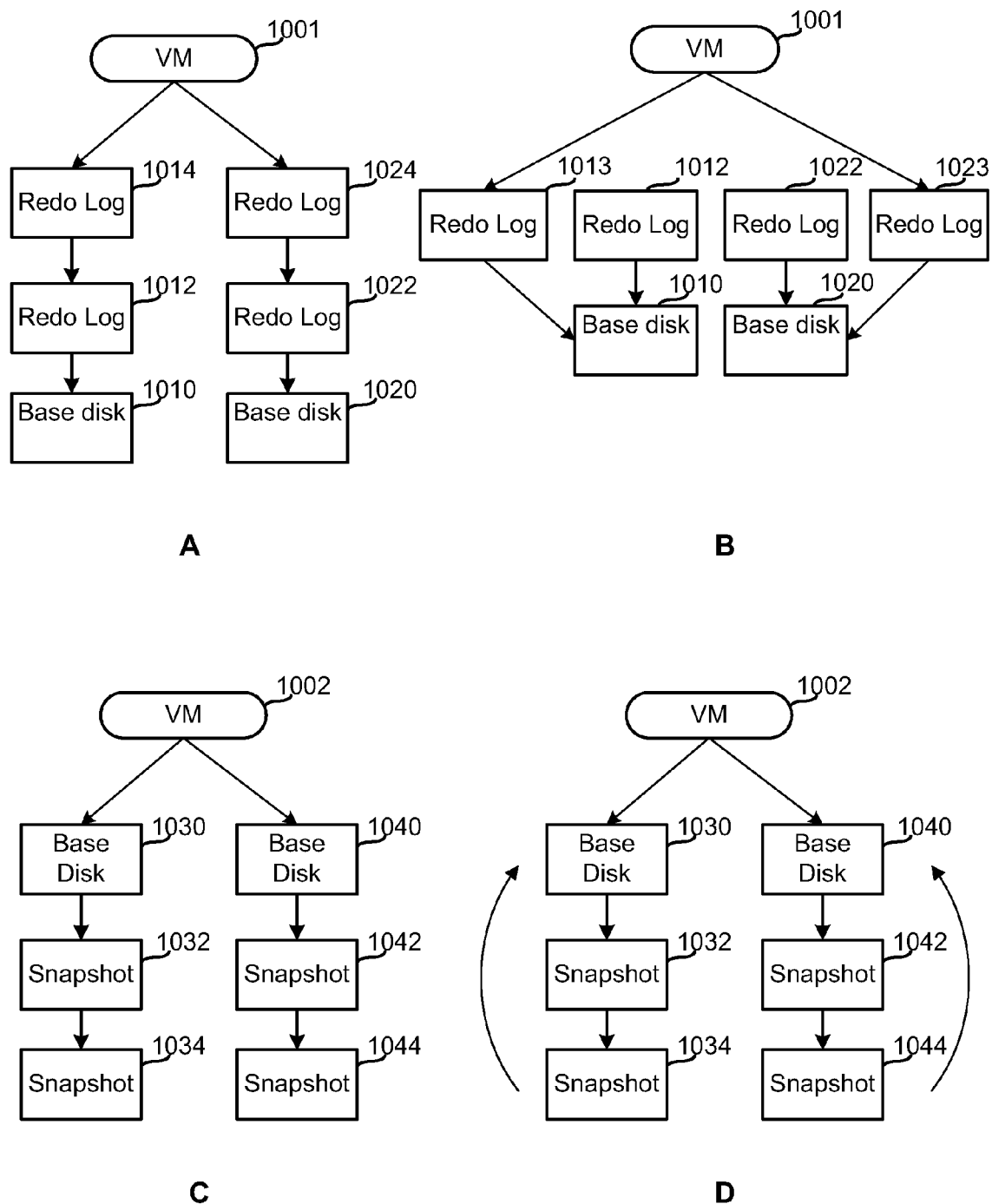
FIG. 10 illustrates an approach for reverting a virtual machine to a previous snapshot state, according to an embodiment.

FIG. 10 illustrates reverting a virtual machine to a previous state, according to an embodiment. As shown in panel A, a VM 1001 is associated with two virtual disks, which include redo-based disk hierarchies comprising redo logs 1012, 1014 and base disk 1010, and redo logs 1022, 1024 and base disk 1020, respectively. Panel B shows a reversion to the state of the VM 1001 before a snapshot was taken that created redo logs 1012 and 1022. As shown, such a revert operation may be performed by simply creating new redo logs 1013 and 1023 and linking those redo logs to base disks 1010 and 1020, respectively.

As shown in panel C, a VM 1002 is associated with COW disk hierarchies comprising base disk 1030 and snapshots 1032, 1034, and base disk 1040 and snapshots 1042, 1044. Panel D shows a reversion to the state of the VM 1002 before a snapshot was taken which created snapshots 1034, 1044. In COW-based systems, content of a snapshot which maintains the snapshot state are copied to the base disk in a reversion operation. As shown in panel D, content of snapshots 1034, 1044 are copied to base disks 1030, 1040, respectively. However, for a VM associated with multiple virtual disks such as VM 1002, some of those disks may be reverted to prior states while other disk reversions fail, leaving the VM in an inconsistent state. To prevent this problem, a snapshot of the base vvol may first be taken. Then, content of the base vvol may be reverted with snapshot vvol(s). If this reversion is unsuccessful, content of the base vvol may be then be reverted using the snapshot of the base vvol, returning the virtual disk to its state before the unsuccessful reversion operation.

Figure 11:
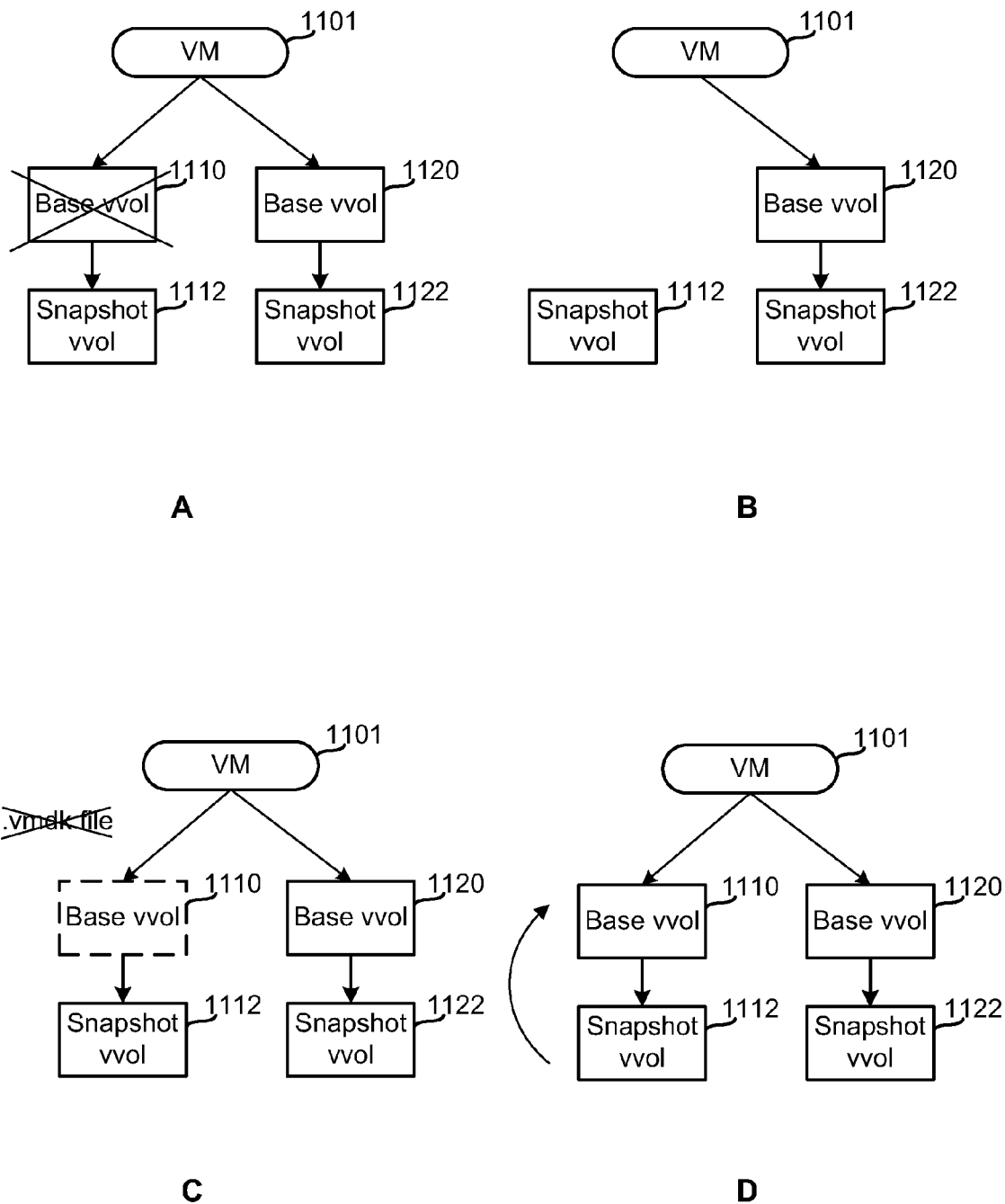
FIG. 11 illustrates an approach for deleting a virtual disk and reverting to a prior snapshot state, according to an embodiment.

FIG. 11 illustrates an approach for deleting a virtual disk followed by a reversion to a previous state of the disk, according to an embodiment. In redo semantics, the deletion may be accomplished by simply removing the currently-running redo log and updating the disk descriptor file, and the reversion may be accomplished by creating a child redo log to replace the deleted redo log and updating the disk descriptor file to refer to the newly created redo log. As shown in panel A, the deletion and reversion in redo semantics would not work for the COW disk hierarchies created according to the disk descriptor swizzling described above. After such swizzling, the redo hierarchy's redo log, to which IOs are performed, is associated with the base vvol 1110, so deletion of this redo log may also delete the base vvol 1110, upon which snapshot 1112 depends. As a result, the snapshot 1112 would become orphaned, as shown in Panel B, and a reversion to the disk state maintained via snapshot 1112 would be impossible.

Panel C illustrates an approach to prevent snapshot 1112 from becoming orphaned. As shown, a disk descriptor file (here, the .vmdk file) is deleted, but the base vvol object 1110 continues to be stored in the storage system. Thereafter, a reversion to the disk state maintained via snapshot 1112 may be accomplished by creating a new disk descriptor file and configuring this disk descriptor file to point to the stored base vvol object. Then, the contents of snapshot 1112 may be copied to the restored base vvol object 1110, and the VM 1101 made to point to the base vvol object 1110, as illustrated in panel D. Note, a reference count may be maintained of the number of children that the base vvol 1110 has, and the based vvol base vvol 1110 may be deleted if the reference count decrements to 0, indicating that no snapshot vvols depend on the base vvol anymore.

Figure 12:
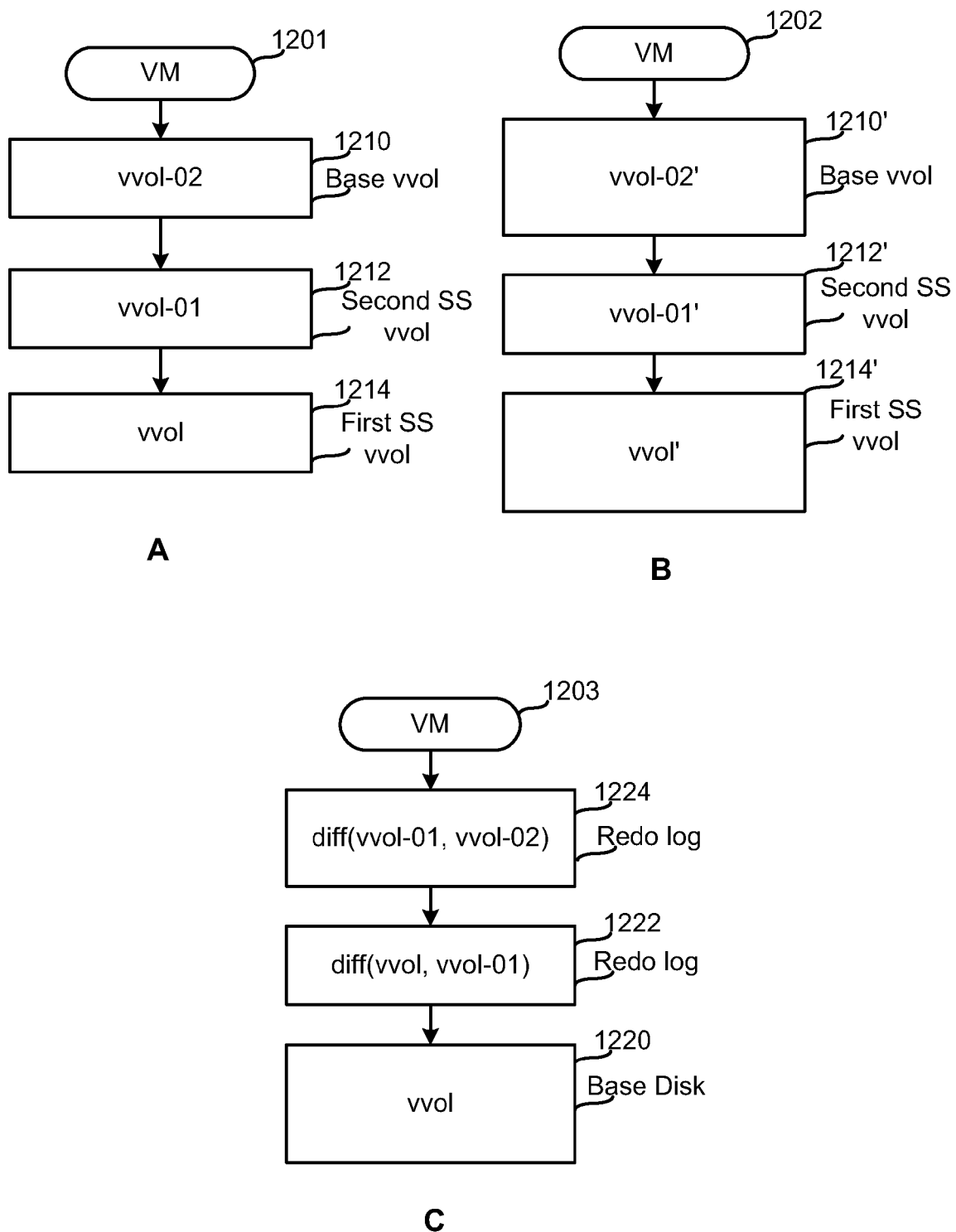
FIG. 12 illustrates approaches for cloning a virtual volume disk hierarchy and migrating the virtual volume disk hierarchy to a redo log disk hierarchy, according to an embodiment.

FIG. 12 illustrates approaches for cloning a COW-based vvol hierarchy and migrating the vvol hierarchy to a redo hierarchy, according to an embodiment. When VM snapshots are copied or moved across storage containers and datastores, it is desirable to preserve COW space optimizations where possible. Such migrations may be across incompatible vvol systems or across vvols and datastores, in which case the hypervisor may need to determine differences between a base vvol and snapshots dependent thereon, and recreate the vvol hierarchy at the destination. As shown in panel A, a VM 1201 is associated with a COW-based vvol hierarchy comprising base disk vvol-02 1210, snapshot vvol-01 1212, and snapshot vvol 1214. As shown in panel B, the VM 1201 and its vvol hierarchy may be cloned by first full cloning snapshot vvol 1214, i.e., the earliest snapshot vvol, to create a new base vvol-02 1210' and taking a snapshot to create snapshot vvol-01 1212'. As used herein, a "full clone" refers to a complete and independent copy of the vvol. Then, the difference between snapshot vvol 1214 and snapshot vvol-01 1212 (diff (vvol, vvol-01)), i.e., the difference between the earliest and the next snapshot, is applied to the snapshot vvol-01 1212', which is then snapshotted again to create snapshot vvol 1214'. This process of applying a difference between a snapshot and its parent, and taking another snapshot, may be repeated if the vvol hierarchy includes additional snapshot vvols. Additionally, the difference between the lastest snapshot vvol 1214 and base vvol-02 1210 (i.e., diff(vvol-01, vvol-02)) is applied to the new base disk vvol 1210'.

Panel C shows a migration to a redo-based datastore. This migration may try to recreate the logical hierarchy of the COW-based vvol hierarchy on a piecewise basis. As shown, the VM 1201 is migrated by first full cloning the earliest snapshot vvol 1214, thereby creating the base disk 1220 of the redo hierarchy. Then, the hypervisor takes a redo snapshot to create redo log 1222, determines a difference between the earliest snapshot vvol 1214 and the next snapshot vvol-01 1212, and applies this difference (i.e., diff(vvol, vvol-01)) to the redo log 1222. This process of taking a redo snapshot, then applying a difference between a snapshot and its parent, may be repeated if the vvol hierarchy includes additional snapshot vvols. In addition, the hypervisor takes a further redo snapshot, creating redo log 1224, and applies the difference between the base vvol-02 1210 and the latest snapshot vvol 1212 (i.e., diff(vvol, vvol-01)) to the redo log 1224. As a result, a redo-based disk hierarchy of the COW-based vvol hierarchy depicted in panel A is created.

Figure 13:
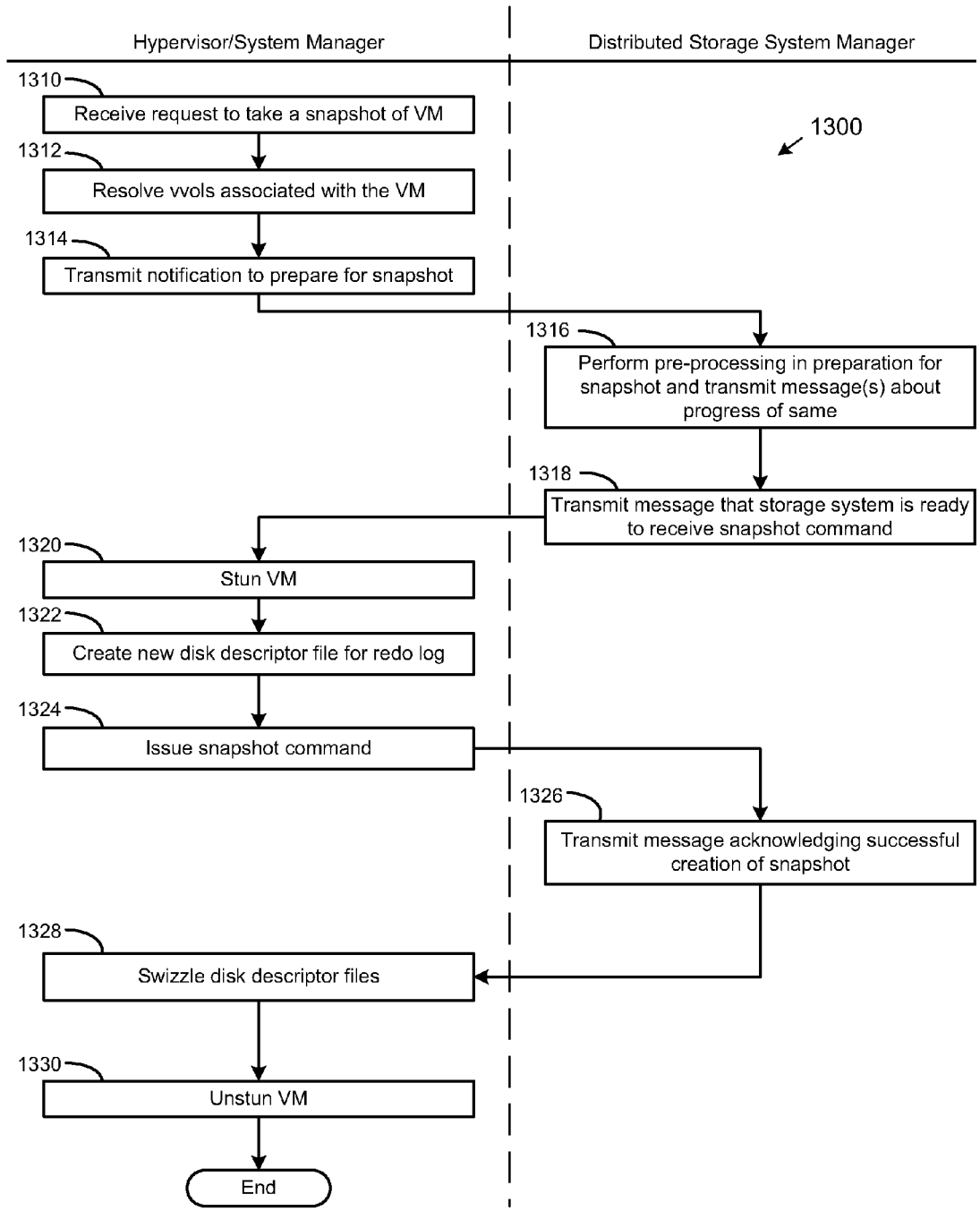
FIG. 13 illustrates a method for taking a virtual volume snapshot, according to an embodiment.

FIG. 13 illustrates a method 1300 for creating a virtual volume snapshot, according to an embodiment. As shown, the method 1300 begins at step 1310, where hypervisor 560 or system manager 611 (which is to be understood as referring to one or more components of the hypervisor 560 and/or system manager 611) receives a request to take a snapshot of a particular VM. At step 312, hypervisor 560 or system manager 611 may resolve the vvols associated with the VM, according to techniques discussed above. At step 1314, hypervisor 560 or system manager 611 transmits a message notifying a storage system to prepare for snapshotting the resolved vvols. As discussed, due to constraints on the amount of time a VM can be stunned and the lengthy time that may be required to initiate and perform a snapshot that is offloaded to a COW-based storage system, such a snapshot may be performed in two phases, an asynchronous preparation phase and a synchronous snapshot phase, to reduce the amount of time that the VM is stunned.

At step 1316, the distributed storage system manager 135 performs pre-processing in preparation for taking the snapshot and transmits message(s) back to the hypervisor 560 or system manager 611 about progress of the same. In one embodiment, the pre-processing may include taking a snapshot, which itself includes creating a COW snapshot vvol, while continuing to allow guest OS IOs to the current running point, i.e., the base disk to which IOs are performed. The storage system may periodically transmit update messages to the hypervisor 560 or system manager 611 about progress of the snapshot.

At step 1318, distributed storage system manager 135 transmits a message notifying the hypervisor that the storage system is ready to receive a snapshot command, i.e., that pre-processing is complete. Then, the hypervisor stuns the VM at step 1320. Stunning the VM may include, e.g., stopping vCPUs of the VM and marking the VM as non-executable.

At step 1322, hypervisor 560 or system manager 611 creates a new disk descriptor file. As discussed, the disk descriptor file may include metadata information about data stored in vvols, and virtual disks may generally comprise both a disk descriptor file and a vvol object. For snapshotting purposes, the redo-based hypervisor 560 or system manager 611 may thus create a new disk descriptor file for a redo log.

At step 1324, hypervisor 560 or system manager 611 issues a snapshot call. In response, the distributed storage system manager 135 transmits, at step 1326, a message to the hypervisor acknowledging the create call, or notifying the hypervisor that the snapshot was not created successfully. In one embodiment, distributed storage system manager 135 may return a temporary vvol ID that represents the snapshot in response to the preparation request of step 1314. In such a case, the snapshot call may be passed this temporary ID, and distributed storage system manager 135 may then finalize the snapshot it set out to create when the preparation request was made. The finalized snapshot vvol ID may or may not be the same as the temporary one. Note, as a result of the pre-processing performed at step 1316, the time between receiving the snapshot call from the hypervisor and the acknowledgment notification may be short.

At step 1328, hypervisor 560 or system manager 611 swizzles disk descriptor files. As discussed, the hypervisor 560 or system manager 611 may use redo-log semantics, which differ from the distributed storage system manager's 135 COW semantics. As a result, the created disk descriptor file created at step 1322 for the redo log may point to the COW snapshot created at step 1316, while a read-only redo log or base disk descriptor file in the redo-based disk hierarchy may point to a base vvol in the COW vvol hierarchy. These associations are incorrect, as the newly created redo log to which I/Os are performed corresponds to the newly created COW base vvol to which I/Os are performed, while the read-only base disk or redo log in the redo-based disk hierarchy corresponds to the read-only snapshot. To correct these associations, the hypervisor may update the newly-created disk descriptor file pointing to the newly-created COW base vvol and the disk descriptor file currently pointing to the COW base vvol such that the newly created disk descriptor file points to the COW base vvol, while the disk descriptor file currently pointing to the COW base vvol is changed to point to the newly-created COW snapshot vvol. This operation is also referred to herein as "swizzling" the disk descriptor files, and may be accomplished by, e.g., updating metadata "vvol ID" values in the disk descriptor files to specify the appropriate vvols. After such swizzling, hypervisor 560 or system manager 611 unstuns the VM, returning the VM to normal execution at step 1330.

Figure 14:
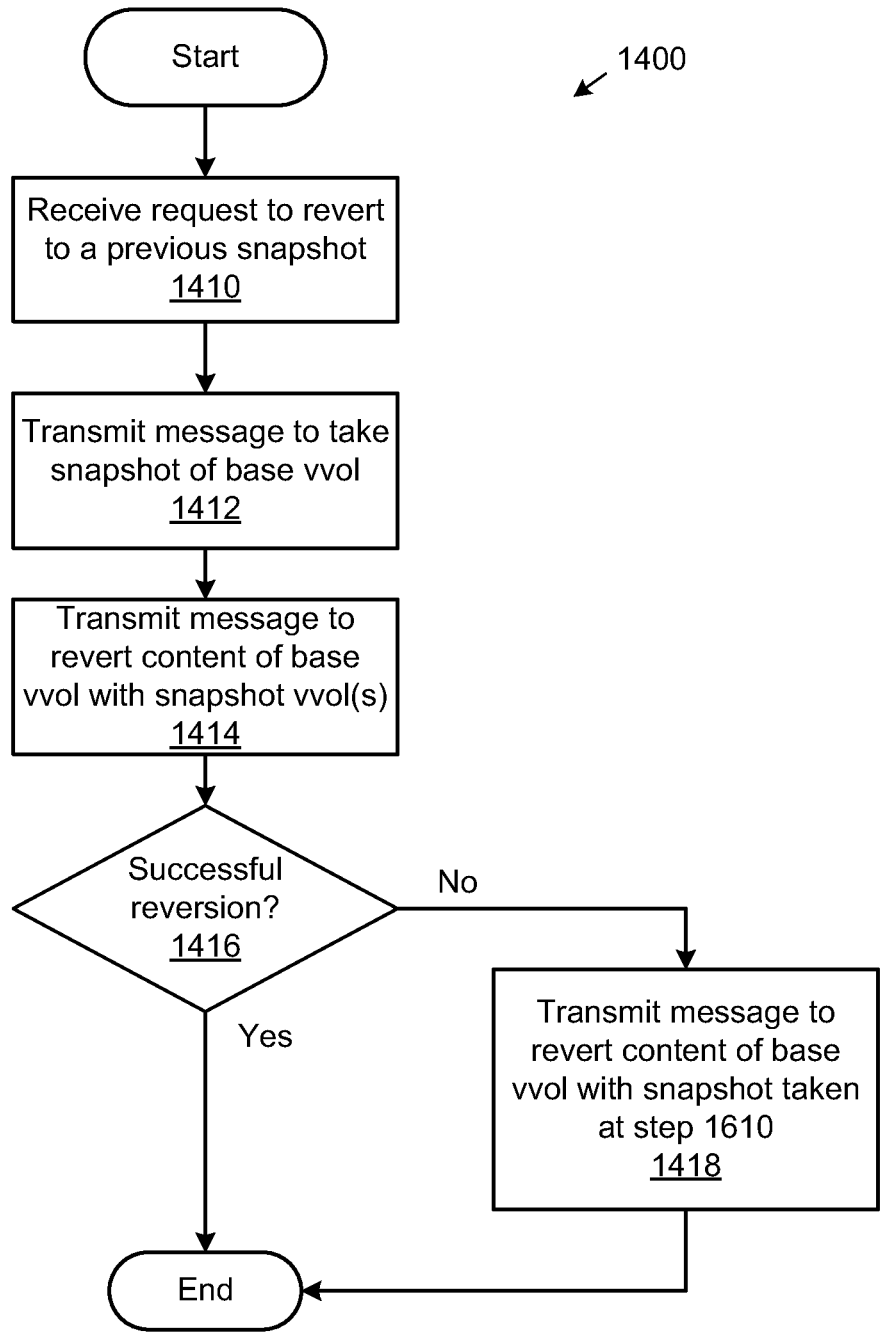
FIG. 14 illustrates a method for performing a revert operation to a prior virtual disk state, according to an embodiment.

FIG. 14 illustrates a method 1400 for performing a revert operation, according to an embodiment. As shown, the method 1400 begins at step 1410, where a hypervisor receives a request to revert a VM to a previous snapshot. As discussed, revert operations may be implemented differently in redo and COW-based systems. In redo-based systems, one or more redo logs are simply deleted, and a new redo log created that has the snapshot redo log (or base disk, as the case may be) as its parent. By contrast, in COW-based systems, content of a snapshot which maintains the snapshot disk state is copied to the base disk.

For a VM associated with multiple virtual disks, some of those disks may be reverted to prior states while other reversions fail, leaving the VM in an inconsistent state. To prevent this problem, hypervisor 560 or system manager 611 transmits, at step 1412, a message to distributed storage system manager 135 to take a snapshot of the base vvol in a COW-based vvol hierarchy. Doing so creates a snapshot vvol that relies upon the base vvol. Then, at step 1414, content of the base vvol is reverted with snapshot vvols in the hierarchy. In particular, distributed storage system manager 135 may copy the contents of the snapshot vvols necessary for the reversion to the base vvol.

At step 1416, it is determined whether the reversion was successful. For example, distributed storage system manager 135 may make such a determination. If the reversion was successful, the method 1400 ends. If the reversion was unsuccessful, then at step 1418, distributed storage system manager 135 reverts the content of the base vvol with the snapshot vvol created at step 1410. Such a reversion may guarantee that the VM is in a consistent state.

Figure 15:
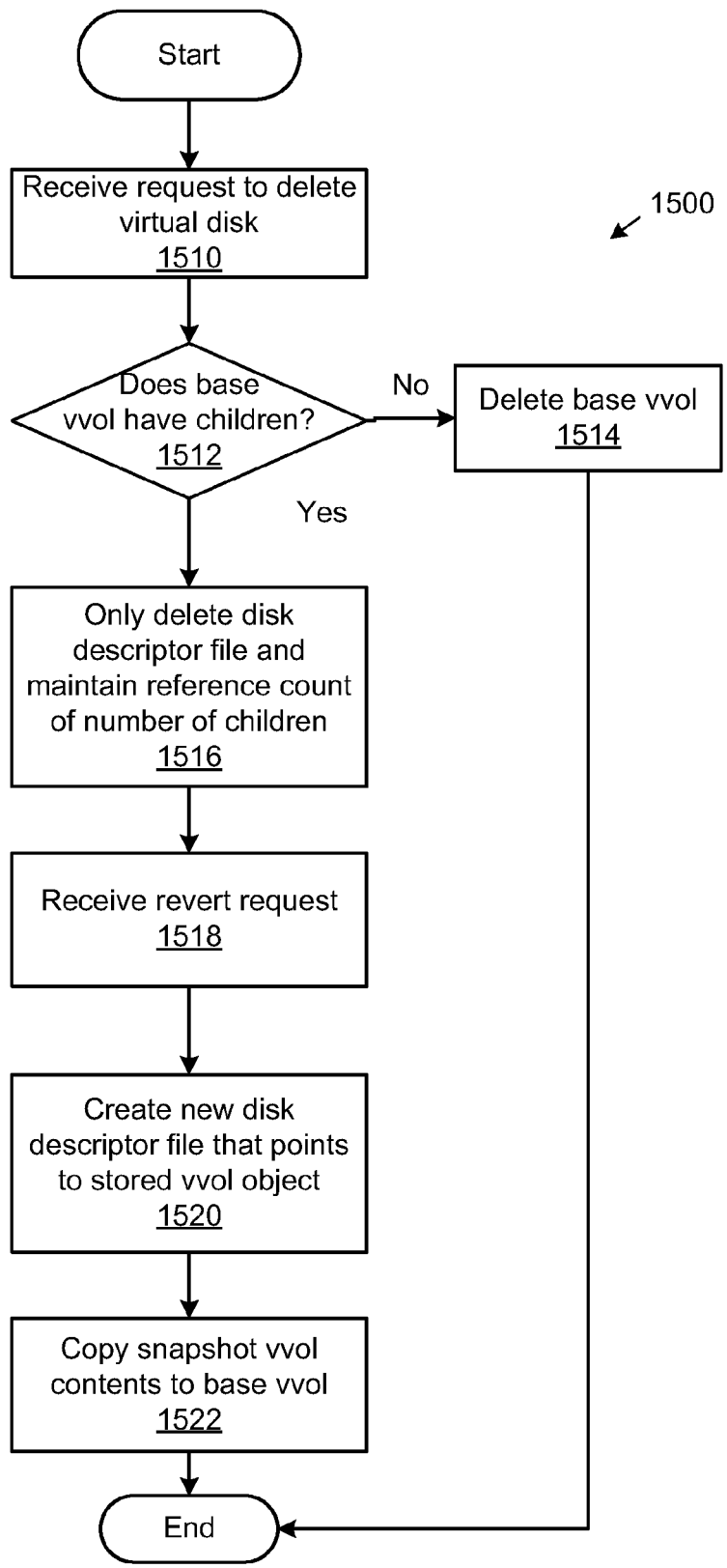
FIG. 15 illustrates a method for deleting a virtual disk followed by reverting to a prior virtual disk state, according to an embodiment.

FIG. 15 illustrates a method 1500 for performing a delete operation followed by a revert operation, according to an embodiment. As shown, the method 1500 begins at step 1510, where a hypervisor 560 or system manager 611 receives a request to delete a base vvol. At step 1512, the hypervisor 560 or system manager 611 determines whether the base vvol has any children, i.e., whether there are any snapshot vvols depending on the base vvol. As the base vvol is associated with the redo log to which IOs are currently being performed, the hypervisor 560 or system manager 611 may simply determine whether the disk descriptor file for the redo log points to a parent.

If the base vvol does not have any children, then, at step 1514, the hypervisor transmits a message to the distributed storage system manager 135 to delete the base vvol. If the base vvol has children, then at step 1516 the hypervisor deletes the disk descriptor file and maintains a reference count of the number of children. The base vvol object itself is not deleted, as the snapshot vvols still depend on the base vvol, and would thus become orphaned if the base vvol object were deleted. However, the based vvol may be deleted if the reference count decrements to 0, indicating that no snapshot vvols depend on the base vvol anymore.

At step 1518, the hypervisor receives a revert request. At step 1520, the hypervisor creates a new disk descriptor file and configures the disk descriptor file to point to the stored base vvol object. Note, the snapshot vvols dependent on the base vvol may themselves maintain references to the base vvol in metadata of associated disk descriptor files. At step 1522, contents of the snapshot vvol that maintains the snapshot state being reverted to are copied to the base vvol object, thereby completing the revert operation.

Figure 16:
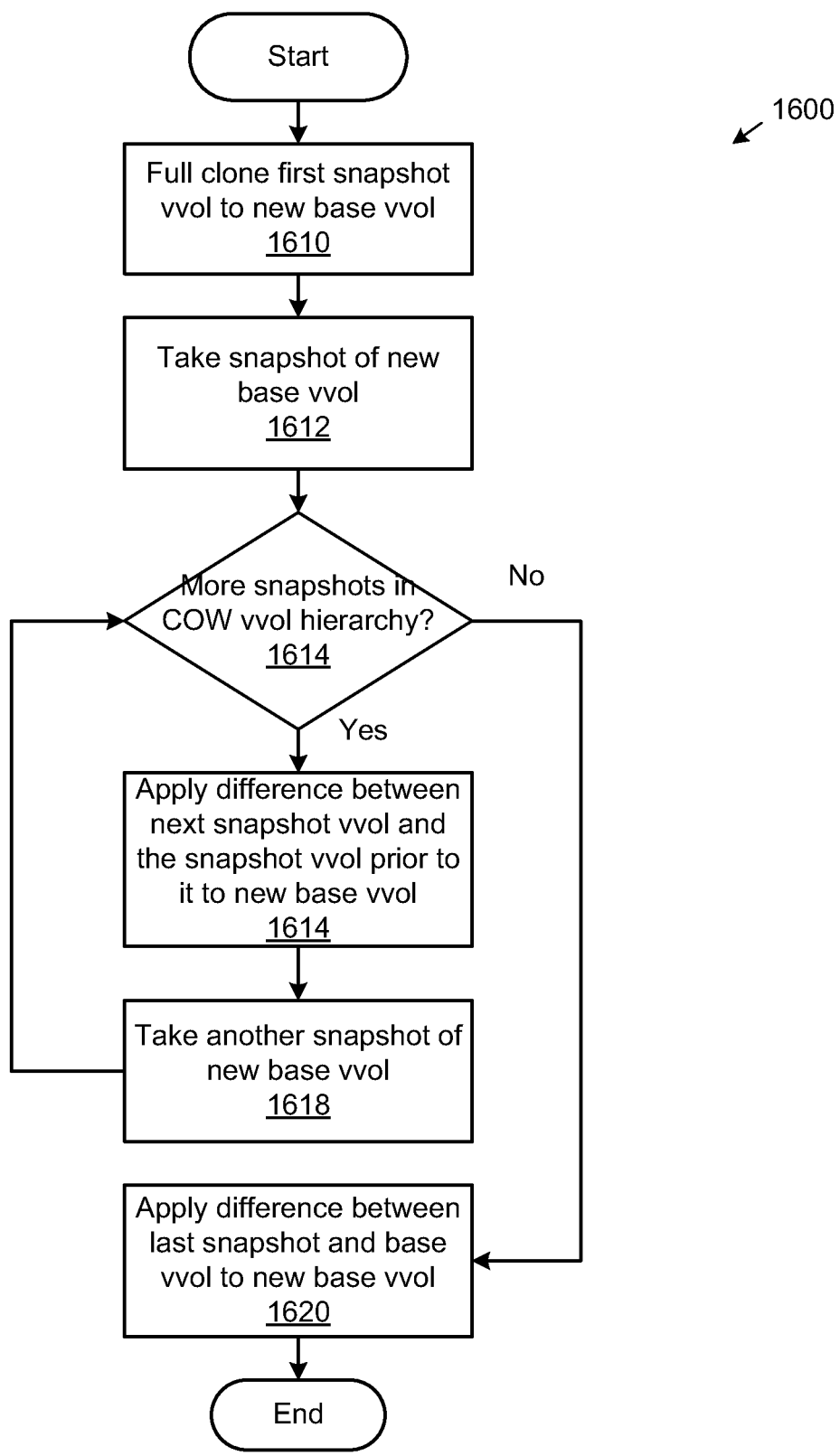
FIG. 16 illustrates a method for cloning a virtual volume disk hierarchy, according to an embodiment.

FIG. 16 illustrates a method 1600 for cloning a vvol hierarchy, according to an embodiment. It is assumed that the vvol hierarchy includes at least one base vvol and one or more snapshot vvols. As shown, the method 1600 begins at step 1610, where a first snapshot vvol in the vvol hierarchy (i.e., the earliest snapshot vvol in the hierarchy) is full-cloned to a new base vvol. As discussed, a "full clone" refers to a complete and independent copy of the vvol. In one embodiment, hypervisor 560 or system manager 611 may issue command(s) to distributed storage system manager 135 to make the full clone, as well as other operations (e.g., snapshot operations) discussed in greater detail below.

At step 1612, a snapshot is taken of the new base vvol. That is, a point-in-time copy of the new base vvol, which is itself a full clone of the original first delta vvol, is made. At step 1614, the hypervisor 560 or system manager 611 determines whether there are more vvols in the COW vvol hierarchy. Note, this may generally exclude a last snapshot which, as discussed in greater detail below, may be compared to the base vvol.

If more vvols are in the COW vvol hierarchy, then at step 1614, hypervisor 560 or system manager 611 determines a difference between a next snapshot vvol and the snapshot vvol prior in time to it, and applies that difference to the new base vvol. For example, the difference may be between snapshot vvols for a first and second snapshot in the vvol hierarchy. Upon applying such a difference to the new base vvol, the contents of the new base vvol may then be identical to that of the second snapshot vvol in the original vvol hierarchy.

In one embodiment, the hypervisor 560 or system manager 611 may invoke difference API 624a exposed by the storage system to determine the difference between the snapshot vvols, and, in response, the distributed storage system manager 135 may return the difference as a bitmap indicating which extents of the first and second snapshot vvols differ. For example, the distributed storage system manager 135 may compare the first and second snapshot vvols based on COW information stored for the vvol hierarchy, such as a COW bit in metadata that indicates whether a copy needs to be made before writing to an extent, and, thus, whether a write has already been performed that may make the contents of one vvol differ from that of another. Of course, the storage system may instead compare the actual data of the first and second snapshot vvols to determine differences between them.

At step 1618, another snapshot of the new base vvol is taken. Continuing the example above, where a difference between snapshot vvols for a first and a second snapshot is determined, the contents of the new base vvol at this point may be identical to that of the second snapshot vvol in the original vvol hierarchy. As a result, a snapshot of the new base vvol, which would be a second snapshot vvol in the new vvol hierarchy, may be a copy of the second snapshot vvol in the original vvol hierarchy.

Returning to step 1614, if there no additional vvols are in the COW vvol hierarchy, then the difference between the last snapshot vvol and the base vvol is applied to the base vvol in the new vvol hierarchy at step 1620. Doing so re-creates the original base vvol as the new base vvol. Once again, hypervisor 560 or system manager 611 may invoke a difference API exposed by distributed storage system manager 135 to determine the difference between vvols, and, in response, distributed storage system manager 135 may return the difference as a bitmap indicating which extents of the vvols differ. In one embodiment, distributed storage system manager 135 may make this comparison based on COW information stored for the vvol hierarchy. In an alternative embodiment, the storage system may compare the actual data of the original base vvol and second snapshot vvol to determine differences between them.

Figure 17:
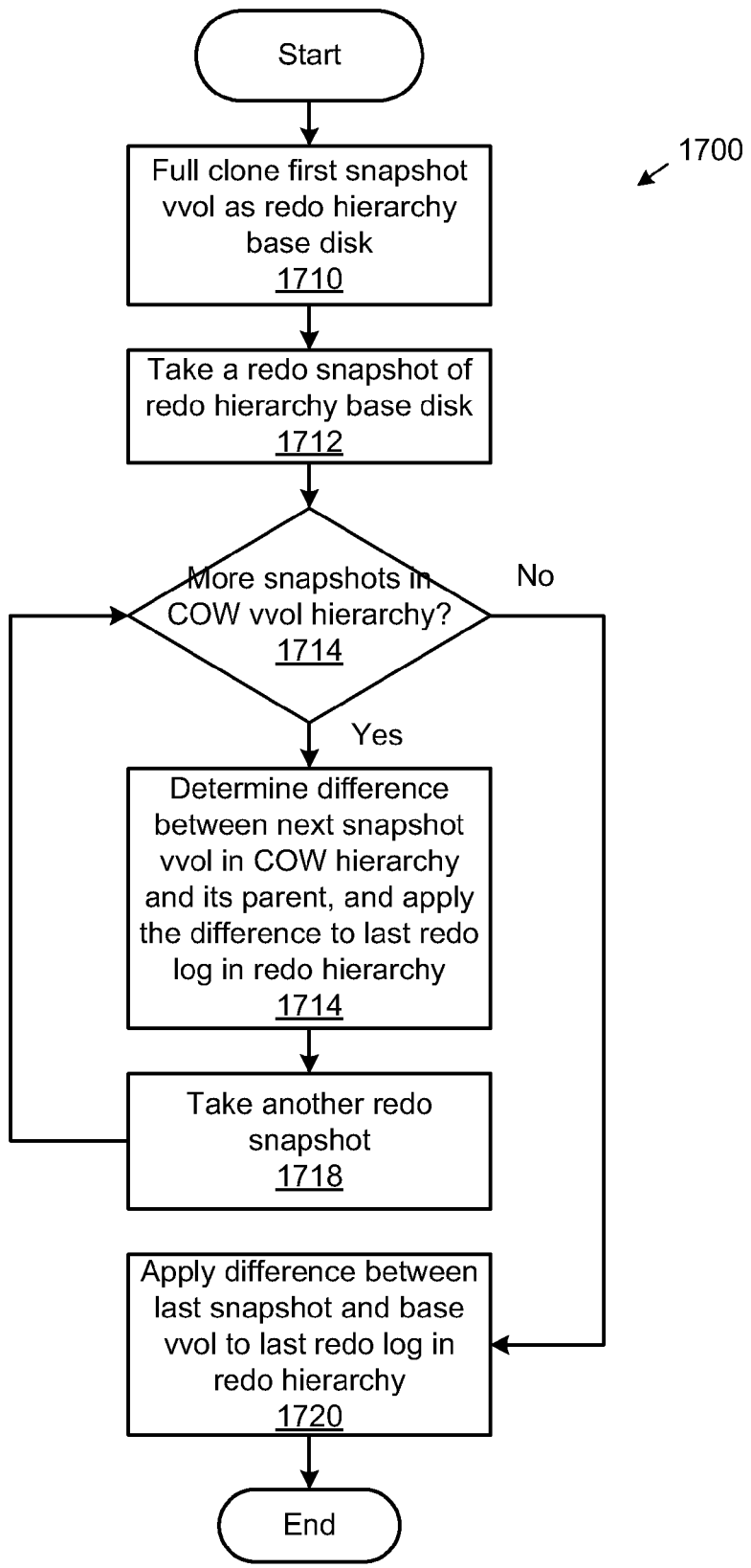
FIG. 17 illustrates a method for migrating a COW-based virtual volume hierarchy to a redo-based disk hierarchy, according to an embodiment.

FIG. 17 illustrates a method 1700 for migrating a COW-based vvol hierarchy to a redo-based disk hierarchy, according to an embodiment. This migration tries to recreate the logical hierarchy of the COW-based vvol hierarchy on a piecewise basis. The reverse migration, from a redo-based disk hierarchy to COW-based vvol hierarchy, may be accomplished using a similar approach. As shown, the method 1700 begins at step 1710, where a full clone of the first snapshot, i.e., the earliest snapshot, of the COW-based vvol hierarchy is made and used as a base disk of the redo vvol hierarchy. In one embodiment, hypervisor 560 or system manager 611 may read the extents of the first snapshot and write those extents to a redo log disk file, such as a file in the .vmdk format.

At step 1712, a first snapshot is taken of the base disk in the redo vvol hierarchy. This may include creating a redo log file, e.g., another .vmdk format file, which has the base disk created at step 1710 as its parent. At step 1714, hypervisor 560 or system manager 611 determines whether there are more vvols in the COW vvol hierarchy. Note, this may generally exclude a last snapshot which, as discussed in greater detail below, may be compared to the base vvol.

If more vvols are in the COW vvol hierarchy, then, at step 1716, hypervisor 560 or system manager 611 determines a difference between a next snapshot vvol in the COW vvol hierarchy and its parent vvol, and applies the difference to a last redo log in the redo-based disk hierarchy. For example, hypervisor 560 or system manager 611 may determine the difference between first and second snapshot vvols in the vvol hierarchy, and apply that difference to a first redo log. As a result, content stored in the first redo log of the redo log hierarchy would be the difference between the base disk of the redo-based disk hierarchy and the state of the virtual disk at a second, later snapshot time. In one embodiment, the hypervisor may invoke difference API 624a exposed by the distributed storage system manager 135 to determine the difference between vvols, and, in response, the storage system may return the difference as a bitmap indicating which extents of the vvols differ. Here, distributed storage system manager 135 may compare the vvols based on COW information stored for the vvol hierarchy, or make a comparison of actual data of the first and second snapshot vvols. Having obtained the difference bitmap, hypervisor 560 or system manager 611 may then read those bits which are indicated as different and write those bits to the redo log disk file created at step 1712.

At step 1718, another redo snapshot is taken. This may include creating an additional redo log file, e.g., another .vmdk format file, which has the redo log file created before it as its parent. The method 1700 then returns to step 1714 again.

At 1714, if there no additional vvols are in the COW vvol hierarchy, then at step 1720, hypervisor 560 or system manager 611 determines a difference between the base vvol of the COW vvol hierarchy and a last snapshot vvol in the COW vvol hierarchy, and applies that difference to the second redo snapshot created at step 1716. As a result, the contents of the last snapshot include the differences in the states of the virtual disk at the last snapshot time and the current time.

Although discussed above primarily with respect to virtual disks associated with VMs, techniques discussed herein are not limited thereto and may be employed virtual disks, or generic files such as backup files, in computer systems generally. Advantageously, embodiments disclosed herein permit a redo-based hypervisor, management server, and/or computer system to be used with a COW-based storage system. Disk snapshots may be offloaded to the COW-based storage system by swizzling disk descriptor files. To revert to an earlier disk state, a snapshot may be taken before copying contents of a snapshot vvol of the COW-based vvol hierarchy to a base vvol of the hierarchy to ensure ensures that the reversion can be rolled back if unsuccessful. Reference counting is performed to ensure that vvols in the vvol hierarchy are not orphaned in delete and revert use cases. Differences between vvols in the COW-based vvol hierarchy may be used to clone the hierarchy and to migrate the hierarchy to a redo-based disk hierarchy, and vice versa. Further, techniques disclosed herein preserve COW space and efficiency optimizations.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. For example, SCSI is employed as the protocol for SAN devices and NFS is used as the protocol for NAS devices. Any alternative to the SCSI protocol may be used, such as Fibre Channel, and any alternative to the NFS protocol may be used, such as CIFS (Common Internet File System) protocol. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments described herein. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method for taking a snapshot of a virtual disk, comprising:
   creating a first disk descriptor file for a redo log configured to store differences from a base disk and from prior redo logs in a redo-based disk hierarchy;
   issuing a command to a storage system to take a first copy-on-write (COW) snapshot of the virtual disk, wherein, after taking the first COW snapshot, the virtual disk comprises a COW-based disk hierarchy of logical storage volumes including at least a base logical storage volume to which inputs/outputs (IOs) are performed and a snapshot logical storage volume which is created as a read-only point-in-time copy of the virtual disk and which is associated with the first disk descriptor file for the redo log;
   changing the first disk descriptor file associated with the snapshot logical storage volume to be associated instead with the base logical storage volume by updating metadata in the first disk descriptor file to point to the base logical storage volume; and
   changing a second disk descriptor file associated with the base logical storage volume to be associated instead with the snapshot logical storage volume by updating metadata in the second disk descriptor file to point to the snapshot logical storage volume.

2. The method of claim 1, wherein the virtual disk is associated with a virtual machine (VM), the method further comprising:
   issuing a notification to the storage system to prepare to take the first COW snapshot, wherein the preparation includes creating the snapshot logical storage volume;
   receiving a notification that the storage system is prepared to take the first COW snapshot;
   stunning the VM before issuing the command to take the first COW snapshot; and
   unstunning the VM after changing the first and second disk descriptor files.

3. The method of claim 1, further comprising, reverting to the first COW snapshot by:
   issuing a command to take a second COW snapshot of the base logical storage volume;
   reverting contents of the base logical storage volume using contents of the snapshot logical storage volume; and
   if reverting to the first COW snapshot fails, reverting contents of the base logical storage volume using contents of the second COW snapshot.

4. The method of claim 1, further comprising, reverting to the COW snapshot after the virtual disk is deleted, by:
   creating a third disk descriptor file;
   associating the third disk descriptor file with the base logical storage volume; and
   reverting contents of the base logical storage volume using contents of the snapshot logical storage volume,
   wherein, when the virtual disk is deleted, the first disk descriptor file associated with the base logical storage volume is deleted but the base logical storage volume is not deleted.

5. The method of claim 4, further comprising:
   maintaining a reference count of children logical storage volumes dependent on the base logical storage volume; and
   if the reference count becomes 0, deleting the base logical storage volume.

6. The method of claim 1, further comprising, cloning the logical storage volume hierarchy by:
   full cloning a snapshot logical storage volume which is earliest in time and using the full clone as a base logical storage volume in a new logical storage volume hierarchy;
   taking a snapshot of the base logical storage volume in the new logical storage volume hierarchy;
   if there are more snapshot logical storage volumes in the logical storage volume hierarchy other than a snapshot logical storage volume which is latest in time, iteratively:
      applying, to the base logical storage volume in the new logical storage volume hierarchy, a difference between a next logical storage volume and a logical storage volume prior to the next logical storage volume, and
      taking a snapshot of the base logical storage volume in the new logical storage volume hierarchy; and
   applying a difference between the logical storage volume which is latest in time and the base logical storage volume to the base logical storage volume in the new logical storage volume hierarchy.

7. The method of claim 6, wherein the difference between the next logical storage volume and the logical storage volume prior to the next logical storage volume and the difference between the logical storage volume which is latest in time and the base logical storage volume are determined based on two COW information stored for the logical storage volume hierarchy.

8. The method of claim 1, further comprising, migrating the logical storage volume hierarchy to a redo-based disk hierarchy by:
   full cloning a snapshot logical storage volume which is earliest in time and using the full clone as a base disk in the redo-based disk hierarchy;
   taking a redo-based snapshot of the base disk, wherein the redo-based snapshot creates a new redo log in the redo-based disk hierarchy;
   if there are more snapshot logical storage volumes in the logical storage volume hierarchy other than a snapshot logical storage volume which is latest in time, iteratively:
      applying, to a redo log latest in time in the redo-based disk hierarchy, a difference between a next logical storage volume and a logical storage volume prior to the next logical storage volume, and
      taking a redo-based snapshot, wherein the redo-based snapshot creates another new redo log in the redo-based disk hierarchy; and
   applying a difference between the logical storage volume which is latest in time and the base logical storage volume to the redo log latest in time in the redo-based disk hierarchy.

9. The method of claim 8, wherein the difference between the next logical storage volume and the logical storage volume prior to the next logical storage volume and the difference between the logical storage volume which is latest in time and the base logical storage volume are determined based on two COW information stored for the logical storage volume hierarchy.

10. A non-transitory computer-readable storage medium embodying computer program instructions for taking a snap shot of a virtual disk, the computer program instructions implementing a method, the method comprising:
- creating a first disk descriptor file for a redo log configured to store differences from a base disk and from prior redo logs in a redo-based disk hierarchy;
- issuing a command to a storage system to take a first copy-on-write (COW) snapshot of the virtual disk, wherein, after taking the first COW snapshot, the virtual disk comprises a COW-based disk hierarchy of logical storage volumes including at least a base logical storage volume to which inputs/outputs (IOs) are performed and a snapshot logical storage volume which is created as a read-only point-in-time copy of the virtual disk and which is associated with the first disk descriptor file for the redo log;
- changing the first disk descriptor file associated with the snapshot logical storage volume to be associated instead with the base logical storage volume by updating metadata in the first disk descriptor file to point to the base logical storage volume; and
- changing a second disk descriptor file associated with the base logical storage volume to be associated instead with the snapshot logical storage volume by updating metadata in the second disk descriptor file to point to the snapshot logical storage volume.

11. The computer-readable storage medium of claim 10, wherein the virtual disk is associated with a virtual machine (VM), the method further comprising:
- issuing a notification to the storage system to prepare to take the first COW snapshot, wherein the preparation includes creating the snapshot logical storage volume;
- receiving a notification that the storage system is prepared to take the first COW snapshot;
- stunning the VM before issuing the command to take the first COW snapshot; and
- unstunning the VM after changing the first and second disk descriptor files.

12. The computer-readable storage medium of claim 10, the method further comprising, reverting to the first COW snapshot by:
- issuing a command to take a second COW snapshot of the base logical storage volume;
- reverting contents of the base logical storage volume using contents of the snapshot logical storage volume; and
- if reverting to the first COW snapshot fails, reverting contents of the base logical storage volume using contents of the second COW snapshot.

13. The computer-readable storage medium of claim 10, the method further comprising, reverting to the COW snapshot after the virtual disk is deleted, by:
- creating a third disk descriptor file;
- associating the third disk descriptor file with the base logical storage volume; and
- reverting contents of the base logical storage volume using contents of the snapshot logical storage volume,
- wherein, when the virtual disk is deleted, the first disk descriptor file associated with the base logical storage volume is deleted but the base logical storage volume is not deleted.

14. The computer-readable storage medium of claim 10, the method further comprising, cloning the logical storage volume hierarchy by:
- full cloning a snapshot logical storage volume which is earliest in time and using the full clone as a base logical storage volume in a new logical storage volume hierarchy;
- taking a snapshot of the base logical storage volume in the new logical storage volume hierarchy;
- if there are more snapshot logical storage volumes in the logical storage volume hierarchy other than a snapshot logical storage volume which is latest in time, iteratively:
  - applying, to the base logical storage volume in the new logical storage volume hierarchy, a difference between a next logical storage volume and a logical storage volume prior to the next logical storage volume, and
  - taking a snapshot of the base logical storage volume in the new logical storage volume hierarchy; and
- applying a difference between the logical storage volume which is latest in time and the base logical storage volume to the base logical storage volume in the new logical storage volume hierarchy.

15. The computer-readable storage medium of claim 14, wherein the difference between the next logical storage volume and the logical storage volume prior to the next logical storage volume and the difference between the logical storage volume which is latest in time and the base logical storage volume are determined based on two COW information stored for the logical storage volume hierarchy.

16. The computer-readable storage medium of claim 10, the method further comprising, migrating the logical storage volume hierarchy to a redo-based disk hierarchy by:
- full cloning a snapshot logical storage volume which is earliest in time and using the full clone as a base disk in the redo-based disk hierarchy;
- taking a redo-based snapshot of the base disk, wherein the redo-based snapshot creates a new redo log in the redo-based disk hierarchy;
- if there are more snapshot logical storage volumes in the logical storage volume hierarchy other than a snapshot logical storage volume which is latest in time, iteratively:
  - applying, to a redo log latest in time in the redo-based disk hierarchy, a difference between a next logical storage volume and a logical storage volume prior to the next logical storage volume, and
  - taking a redo-based snapshot, wherein the redo-based snapshot creates another new redo log in the redo-based disk hierarchy; and
- applying a difference between the logical storage volume which is latest in time and the base logical storage volume to the redo log latest in time in the redo-based disk hierarchy.

17. The computer-readable storage medium of claim 16, wherein the difference between the next logical storage volume and the logical storage volume prior to the next logical storage volume and the difference between the logical storage volume which is latest in time and the base logical storage volume are determined based on two COW information stored for the logical storage volume hierarchy.

18. A system, comprising:
a processor; and
a memory, wherein the memory includes a program for taking a snapshot of a virtual disk, the program being configured to perform operations comprising:
- creating a first disk descriptor file for a redo log configured to store differences from a base disk and from prior redo logs in a redo-based disk hierarchy,
- issuing a command to a storage system to take a first copy-on-write (COW) snapshot of the virtual disk, wherein, after taking the first COW snapshot, the virtual disk comprises a COW-based disk hierarchy of logical storage volumes including at least a base logical storage volume to which inputs/outputs (IOs) are performed and a snapshot logical storage volume which is created as a read-only point-in-time copy of the virtual disk and which is associated with the first disk descriptor file for the redo log, changing the first disk descriptor file associated with the snapshot logical storage volume to be associated instead with the base logical storage volume by updating metadata in the first disk descriptor file to point to the base logical storage volume, and changing a second disk descriptor file associated with the base logical storage volume to be associated instead with the snapshot logical storage volume by updating metadata in the second disk descriptor file to point to the snapshot logical storage volume.

* * * * *